(12) United States Patent
Sakamoto et al.

(10) Patent No.: US 8,670,678 B2
(45) Date of Patent: Mar. 11, 2014

(54) DIGITAL COHERENT RECEIVER AND DIGITAL COHERENT RECEPTION METHOD

(75) Inventors: Yuichirou Sakamoto, Kawasaki (JP); Kosuke Komaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 249 days.

(21) Appl. No.: 13/034,082

(22) Filed: Feb. 24, 2011

(65) Prior Publication Data

US 2011/0229127 A1 Sep. 22, 2011

(30) Foreign Application Priority Data

Mar. 19, 2010 (JP) .................................. 2010-065281

(51) Int. Cl.
*H04B 10/06* (2011.01)
(52) U.S. Cl.
USPC ........... 398/208; 398/202; 398/209; 398/205; 398/206; 398/136; 398/137; 398/188
(58) Field of Classification Search
USPC ......... 398/202, 204, 205, 206, 207, 208, 209, 398/210, 11, 212, 213, 214, 183, 184, 188, 398/135, 136, 65, 152, 158, 159, 81, 147, 398/137, 138, 139, 203, 25, 26, 27
See application file for complete search history.

(56) References Cited

U.S. PATENT DOCUMENTS

| | | | |
|---|---|---|---|
| 7,894,728 B1 * | 2/2011 | Sun et al. .................... | 398/208 |
| 8,249,463 B2 * | 8/2012 | Perkins ........................ | 398/152 |
| 2009/0226189 A1 | 9/2009 | Ito | |
| 2010/0209121 A1 * | 8/2010 | Tanimura .................... | 398/202 |
| 2010/0232809 A1 * | 9/2010 | Cai et al. ..................... | 398/202 |
| 2011/0150503 A1 * | 6/2011 | Winzer ........................ | 398/202 |

FOREIGN PATENT DOCUMENTS

| | | |
|---|---|---|
| JP | 2009-212994 | 9/2009 |
| JP | 2009-219097 | 9/2009 |
| JP | 2010-050803 | 3/2010 |

OTHER PUBLICATIONS

Gardner, F., *A BPSK/QPSK Timing-Error Detector for Sampled Receivers*, IEEE Transactions on Communications, vol. COM-34, No. 5, May 1986, pp. 423-429.
Gardner, F., *A BPSK/QPSK Timing-Error Detector for Sampled Receivers*, IEEE Transactions on Communications, vol. COM-34, No. 5, May 1996, pp. 423-429.
Ly-Gagnon, D. et al., Coherent Detection of Optical Quadrature Phase-Shift Keying Signals with Carrier Phase Estimation, Journal of Lightwave Technology, vol. 24, No. 1, Jan. 2006, pp. 12-21.
Japanese Office Action mailed Sep. 3, 2013 in corresponding Japanese Application No. 2010-065281.
Takahito Tanimura et al., "A Simple Digital Skew Compensator for Coherent Receiver" ECOC 2009, Sep. 20-24, 2009, Vienna, Austria, pp. 1-2.

(Continued)

*Primary Examiner* — Hanh Phan
(74) *Attorney, Agent, or Firm* — Staas & Halsey LLP

(57) ABSTRACT

A digital coherent receiver converts signals and local light respectively detected, as detection results, in signal light from an optical transmission line, into digital signals and that further applies digital processing to the digital signals. The receiver includes a skew detecting unit that detects skew between the digital signals; a skew control unit controls the skew of each of the signals so that the skew to be detected by the skew detecting unit will be reduced; and a demodulating unit that demodulates each signal controlled for skew by the skew control unit.

18 Claims, 22 Drawing Sheets

(56) References Cited

OTHER PUBLICATIONS

Zheng Liu, et al., "Timing Error Calibration in Time-Interleaved ADC by Sampling Clock Phase", IMTC 2007—IEEE Instrumentation and Measurement Technology Conference, Warsaw, Poland, May 1-3, 2007, pp. 1-4.

Nikola Nedovic et al., "A 2×22Gb/s SFI5.2 CDR/Deserializer in 65nm CMOS Technology", 2009 Symposium on VLSI Circuits Digest of Technical Papers, IEEE, Jun. 16, 2009, pp. 10-11.

* cited by examiner

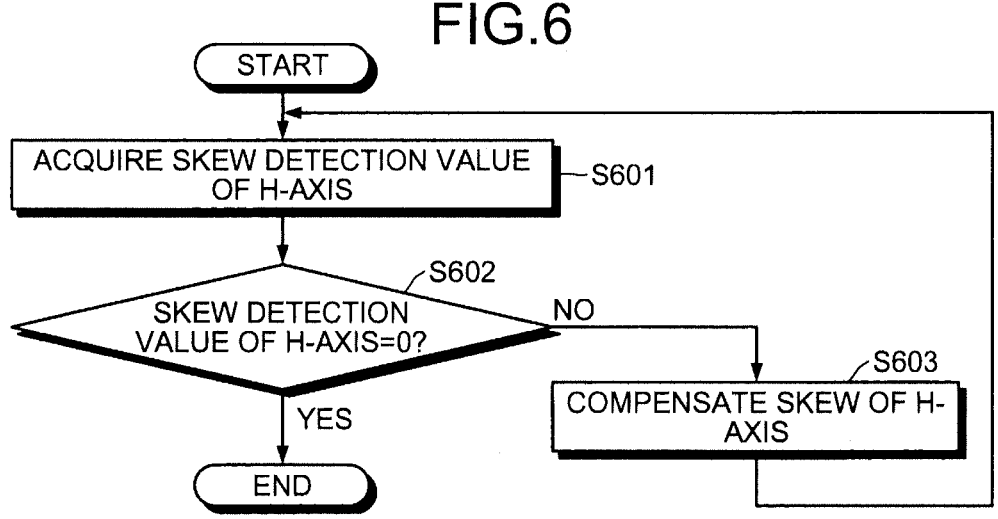
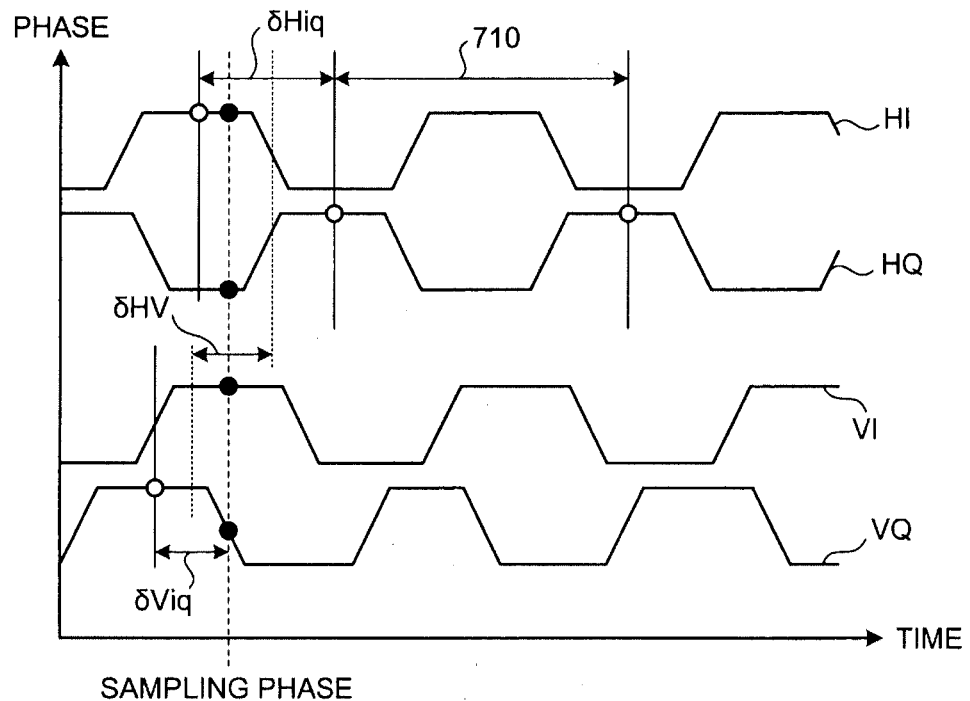

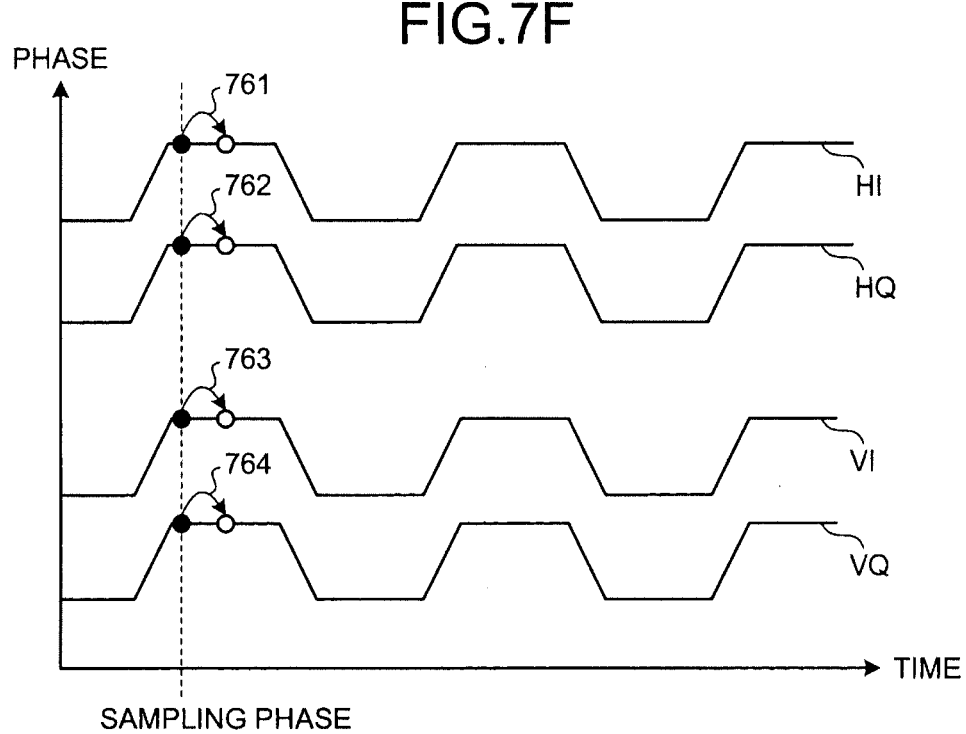

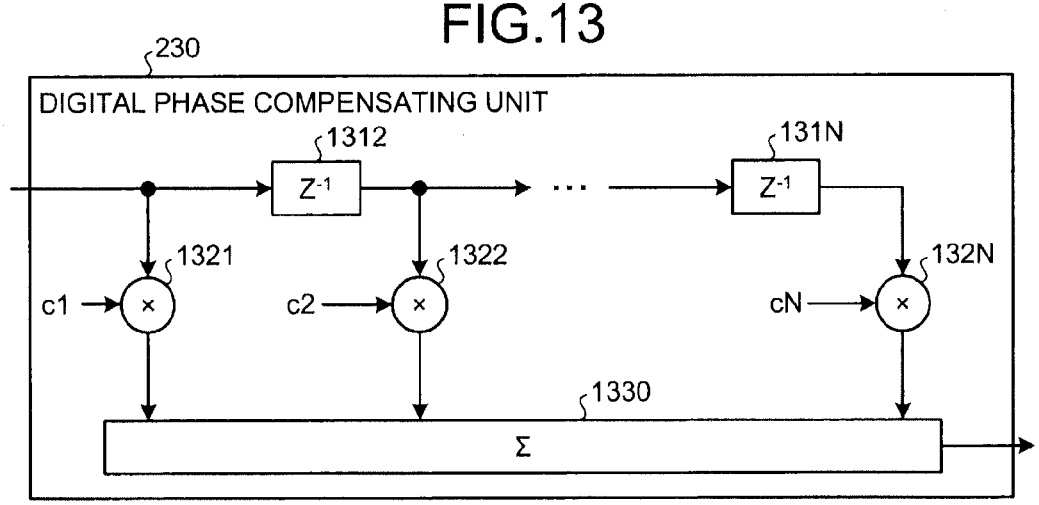
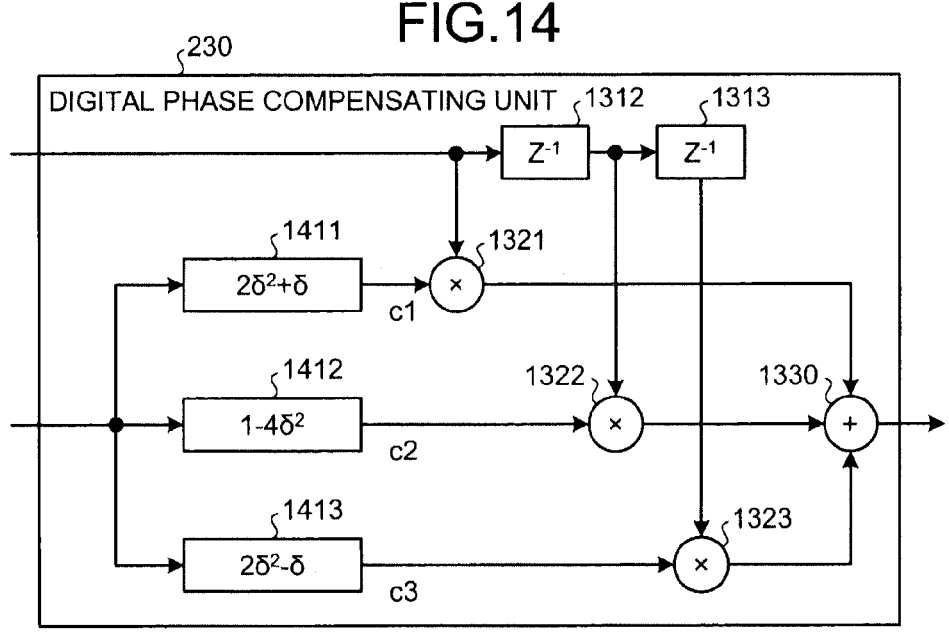

DIGITAL COHERENT RECEIVER AND DIGITAL COHERENT RECEPTION METHOD

CROSS REFERENCE TO RELATED APPLICATIONS

This application is based upon and claims the benefit of priority of the prior Japanese Patent Application No. 2010-065281, filed on Mar. 19, 2010, the entire contents of which are incorporated herein by reference.

FIELD

The embodiments discussed herein are related to digital coherent reception.

BACKGROUND

Accompanying increased traffic on the Internet, a larger capacity trunk-line optical communication system is demanded and, research and development is being conducted for an optical transceiver capable of transmitting signals of over 100 [Gbit/s] per wavelength. As bit rate per wavelength increases, deterioration of the signal quality becomes greater due to a decrease of the optical signal-to-noise ratio (OSNR) resistance, waveform distortion caused by wavelength dispersion, polarization mode dispersion, or nonlinear effect, etc., of a transmission line.

For this reason, in recent years, a digital coherent reception system is being studied that has such OSNR resistance and waveform distortion resistance (see, e.g., Japanese Patent Laid-Open Publication No. 2009-212994). As compared with a conventional system of direct detection by assigning the on/off of the light intensity to a binary signal, the digital coherent reception system extracts light intensity and phase information by the coherent receiving system. The extracted intensity and phase information is quantized by an analog-to-digital converter (ADC) and demodulated by a digital signal processing circuit.

The conventional technology described above, however, has a problem in that the reception quality in the digital coherent receiver deteriorates due to skew (delay time difference) between signals of each channel. Factors causing the skew caused between the signals of each channel are thought to be individual differences, etc., between constituent elements such as electric lines, optical hybrid circuits, opto-electronic converters, ADCs, etc., that make up a path of a channel, upstream from a digital processing unit.

The signals included in signal light are sampled, for example, at the ADCs with same phase timing and therefore, if there is skew between the signals of each channel, the sampling point deviates from the optimal point, resulting in deteriorated quality of the signal reproduced at the digital signal processing circuit.

While it is conceivable to perform sampling with different timings for the signals included in the signal light, a configuration must be disposed for controlling each sampling timing, resulting in a problem of an increased scale of the circuit.

SUMMARY

According to an aspect of an embodiment, a digital coherent receiver converts signals and local light respectively detected, as detection results, in signal light from an optical transmission line, into digital signals and that further applies digital processing to the digital signals. The digital coherent receiver includes a skew detecting unit that detects skew between the digital signals; a skew control unit controls the skew of each of the signals so that the skew to be detected by the skew detecting unit will be reduced; and a demodulating unit that demodulates each signal controlled for skew by the skew control unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a flowchart of an example of skew compensation of the H-axis.

FIG. 7A depicts signals before compensation by the digital signal processing circuit.

FIG. 7F depicts digital phase compensation of the signals.

FIG. 13 depicts an example of a digital phase compensating unit depicted in FIG. 2.

FIG. 14 depicts an example of the digital phase compensating unit depicted in FIG. 13.

DESCRIPTION OF EMBODIMENTS

Preferred embodiments of the present invention will be explained with reference to the accompanying drawings. The disclosed technology detects skew between signals converted to digitally converted signals and controls the skew of each signal based on the detected skew so that the skew between the signals will be reduced and digital demodulation will be performed with accuracy to improve reception quality.

Figure 1:
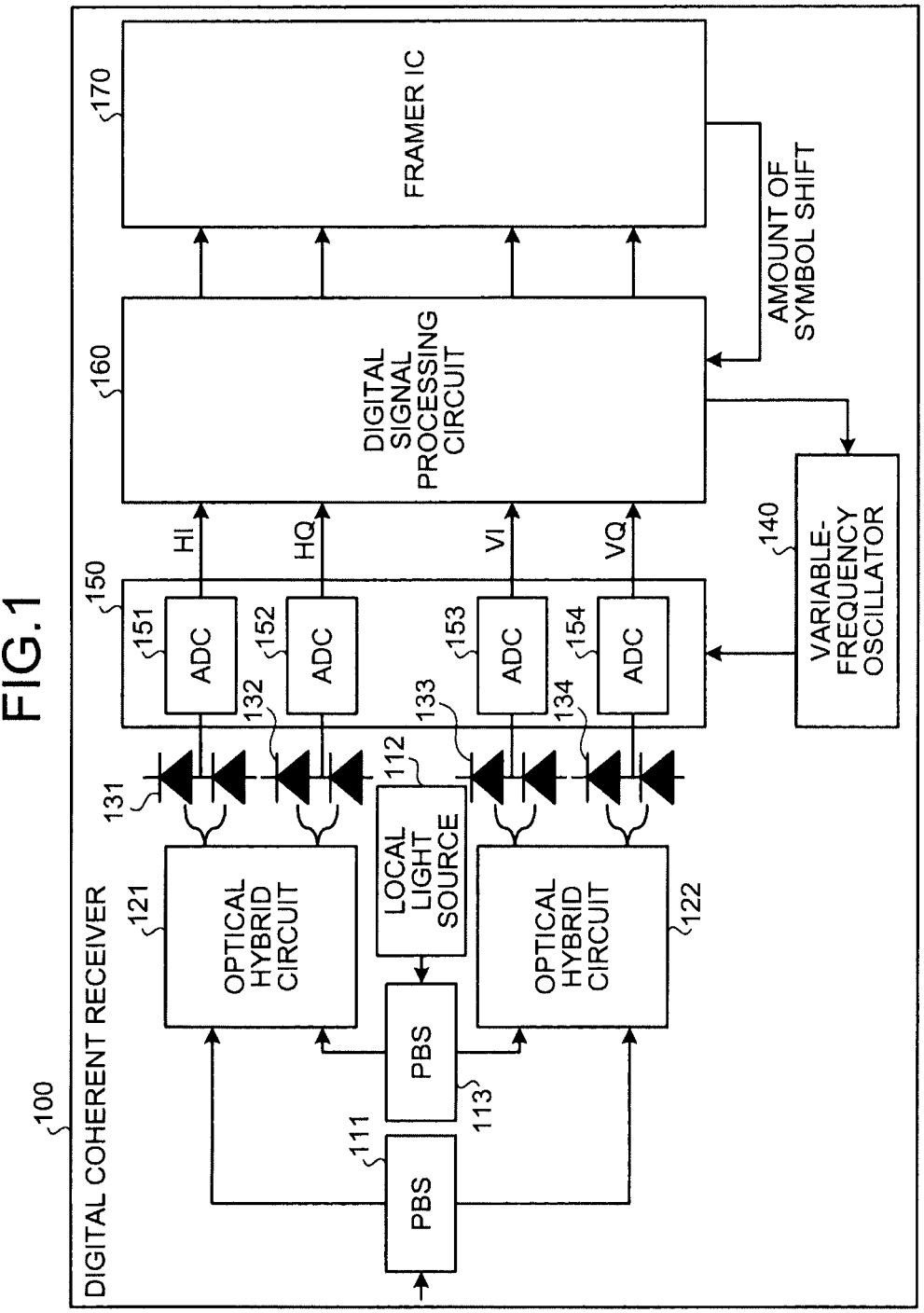
FIG. 1 depicts an exemplary configuration of a digital coherent receiver according to an embodiment.

FIG. 1 depicts an exemplary configuration of a digital coherent receiver according to an embodiment. A digital coherent receiver 100 depicted in FIG. 1 is a digital coherent receiver that converts results of detection of signal light from an optical transmission line and local light to a digital signal and performs digital processing of the signal. The signal light received by the digital coherent receiver 100 includes plural signals by multi-level modulation, polarization division multiplexing, frequency-division multiplexing, etc.

Although an example will be described in which a scheme of dual polarization quadrature phase shift keying (DP-QPSK) corresponding to 4QAM with polarization multiplexing number of 2) and having a primary transmission speed of 112 [Gbps] is used, the transmission speed and the scheme are not limited hereto. It is assumed that two polarized waves (H-axis and V-axis) that are orthogonal respectively include I-channel (in-phase signal) and Q-channel (phase-quadrature signal) signals.

As depicted in FIG. 1, the digital coherent receiver 100 is equipped with a polarization beam splitter (PBS) 111, a local light source 112, a PBS 113, optical hybrid circuits 121 and 122, opto-electronic converters 131 to 134, a variable-frequency oscillator 140, a digital converting unit 150, a digital signal processing circuit 160, and a framer IC 170.

The PBS 111 receives input of the signal light transmitted by way of the optical transmission line. The PBS 111 is a polarization separating unit that separates the input signal light into polarizing axes (H-axis and V-axis). The PBS 111 outputs the separated H-axis signal light to the optical hybrid circuit 121. The PBS 111 further outputs the separated V-axis signal light to the optical hybrid circuit 122.

The local light source 112 generates and outputs the local light to the PBS 113. The PBS 113 separates the local light output from the local light source 112 into polarizing axes (H-axis and V-axis). The PBS 113 outputs the separated H-axis local light to the optical hybrid circuit 121. The PBS 113 further outputs the separated V-axis local light to the optical hybrid circuit 122.

The optical hybrid circuit 121 is an extracting unit that extracts signals of orthogonal phases included in the H-axis signal light (I and Q channel signals) by performing the detection based on the H-axis signal light output from the PBS 111 and the local light output from the PBS 113. The optical hybrid circuit 121 outputs the signal light corresponding to the amplitude and the phase of the I channel of the signal light to the opto-electronic converter 131. The optical hybrid circuit 121 outputs the signal light corresponding to the amplitude and the phase of the Q channel of the signal light to the opto-electronic converter 132.

The optical hybrid circuit 122 is an extracting unit that extracts signals of orthogonal phases included in the V-axis signal light (I and Q channel signals) by performing the detection based on the V-axis signal light output from the PBS 111 and the local light output from the PBS 113. The optical hybrid circuit 122 outputs the signal light corresponding to the amplitude and the phase of the I channel of the signal light to the opto-electronic converter 133. The optical hybrid circuit 122 outputs the signal light corresponding to the amplitude and the phase of the Q channel of the signal light to the opto-electronic converter 134. Each of the signal lights output by the optical hybrid circuits 121 and 122 is a 28 [Gbps] signal.

Each of the opto-electronic converters 131 and 132 opto-electronically converts the signal light output from the optical hybrid circuit 121 and outputs the converted signals to the digital converting unit 150. Each of the opto-electronic converters 133 and 134 opto-electronically converts the signal light output from the optical hybrid circuit 122 and outputs the converted signal to the digital converting unit 150.

The variable-frequency oscillator 140 generates a clock of a variable frequency and outputs the generated clock signal to the digital converting unit 150. The clock signal output by the variable-frequency oscillator 140 is, for example, a 56 [GHz] signal. The variable-frequency oscillator 140 changes the frequency of the clock to be generated, based on a sampling phase detection value to be output from the digital signal processing circuit 160.

The digital converting unit 150 is equipped with ADCs 151 to 154. The ADC 151 performs digital sampling of the signal output from the opto-electronic converter 131. Likewise, the ADCs 152 to 154 perform the digital sampling of the signals output from the opto-electronic converters 132 to 134, respectively. Each of the ADCs 151 to 154 performs the digital sampling in synchronization with the clock signal output from the variable-frequency oscillator 140. Thus, the digital converting unit 150 performs the digital sampling of the signals with the same timing. Each of the ADCs 151 to 154 outputs the digitally-sampled signal to the digital signal processing circuit 160.

The I-channel signal of the H-axis output from the ADC 151 is indicated as a signal HI. The Q-channel signal of the H-axis output from the ADC 152 is indicated as a signal HQ. The I-channel signal of the V-axis output from the ADC 153 is indicated as a signal VI. The Q-channel signal of the V-axis output from the ADC 154 is indicated as a signal VQ. Each of the signals HI, HQ, VI, and VQ is, for example, a 468 [Mbps]×768 parallel signal.

The digital signal processing circuit 160 performs digital signal processing of the signals HI, HQ, VI, and VQ output from the digital converting unit 150. The digital signal processing circuit 160 outputs the signals HI, HQ, VI, and VQ that have undergone the digital signal processing to the framer IC 170. The framer IC 170 performs signal processing of the signals HI, HQ, VI, and VQ output from the digital signal processing circuit 160. The framer IC 170 has a function of a symbol shift detecting unit that detects the amount of the symbol shift among the signals HI, HQ, VI, and VQ. The framer IC 170 outputs the detected symbol shift amount to the digital signal processing circuit 160.

Figure 2:
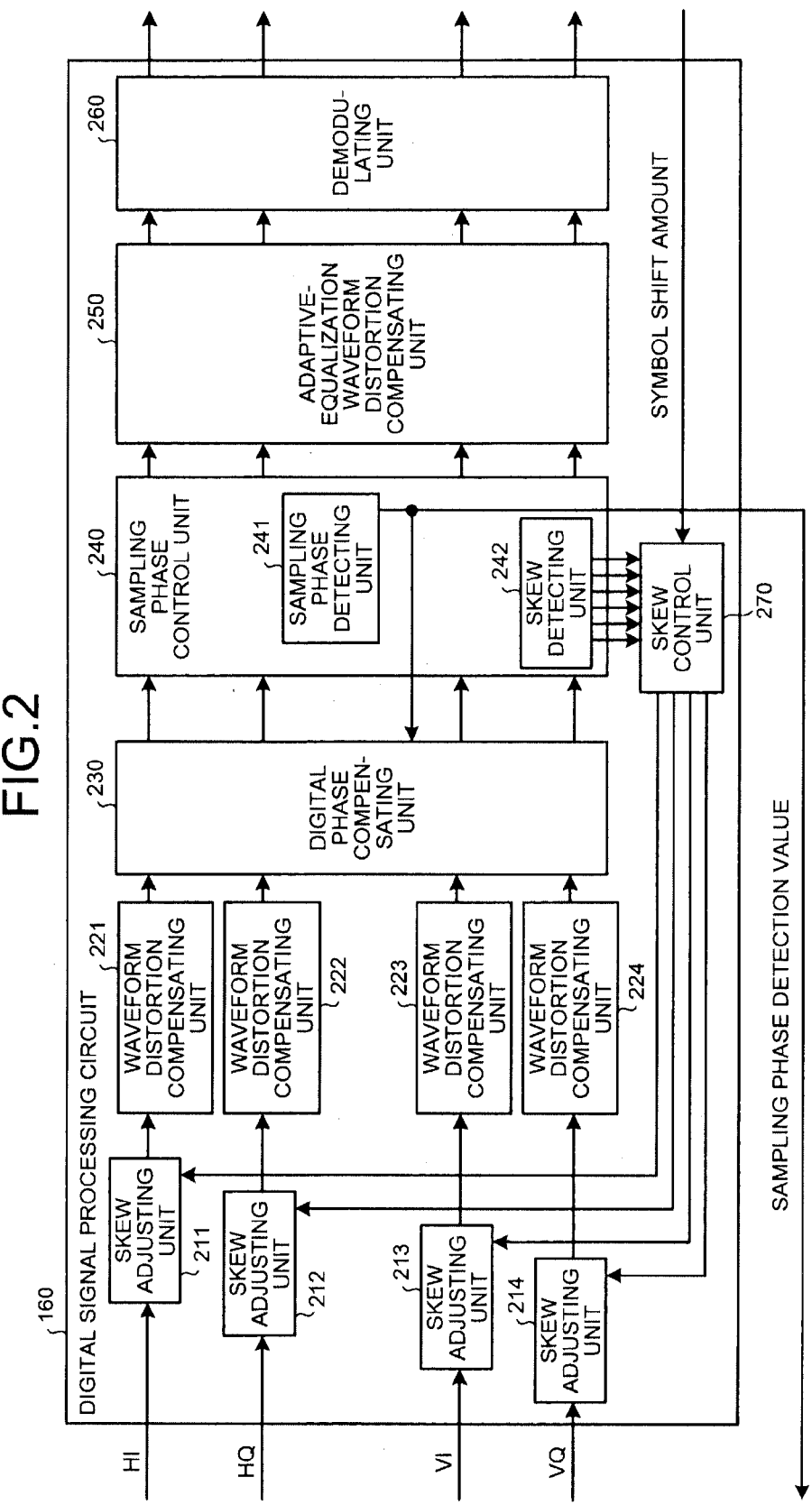
FIG. 2 depicts an exemplary configuration of the digital signal processing circuit depicted in FIG. 1.

FIG. 2 depicts an exemplary configuration of the digital signal processing circuit depicted in FIG. 1. As depicted in FIG. 2, the digital signal processing circuit 160 is equipped with skew adjusting units 211 to 214, waveform distortion compensating units 221 to 224, a digital phase compensating unit 230, a sampling phase control unit 240, an adaptive-equalization waveform distortion compensating unit 250, a demodulating unit 260, and a skew control unit 270. Units of the digital signal processing circuit 160 may be implemented by a single digital signal processor (DSP) or may be implemented by different DSPs.

The skew adjusting unit 211 adjusts the skew of the signal HI output from the ADC 151, based on the skew adjusting amount output from the skew control unit 270. The skew adjusting unit 211 outputs the skew-adjusted signal HI to the waveform distortion compensating unit 221. Likewise, the skew adjusting units 212 to 214 adjust the skew of the signals HQ, VI, and VQ output from the ADCs 152 to 154, respectively, based on the skew adjusting amount output from the skew control unit 270. The skew adjusting units 212 to 214 output the skew-adjusted signals HQ, VI, and VQ to the waveform distortion compensating units 222 to 224, respectively. Each of the skew adjusting units 211 to 214 adjusts the skew, for example, by imparting a variable amount of delay to the signal.

The waveform distortion compensating unit 221 compensates the waveform distortion (waveform distortion occurring over optical transmission line) of the signal HI output from the skew adjusting unit 211. Likewise, the waveform distortion compensating units 222 to 224 compensate the waveform distortion of the signals HQ, VI, and VQ output from the skew adjusting units 212 to 214, respectively. Specifically, the waveform distortion compensating units 221 to 224 compensate a semi-fixed, transmission-line, waveform distortion component that changes according to variations in propagation properties such as temperature variations. Each of the waveform distortion compensating units 221 to 224 outputs to the digital phase compensating unit 230, the signal compensated for waveform distortion.

The digital phase compensating unit 230 is a phase control unit that performs digital phase compensation (sampling phase compensation) to reduce phase variations of the signals output from the waveform distortion compensating units 221 to 224, based on the sampling phase detection value output from the sampling phase control unit 240. For example, the digital phase compensating unit 230 compensates for high-speed variations of the sampling phase that are difficult to follow by a feed-back control to the variable-frequency oscillator 140. The digital phase compensating unit 230 outputs to the sampling phase control unit 240, each signal that has undergone the digital phase compensation.

The sampling phase control unit 240 controls the sampling phase of each signal output from the digital phase compensating unit 230. Specifically, the sampling phase control unit 240 is equipped with a sampling phase detecting unit 241 and a skew detecting unit 242. The sampling phase detecting unit 241 detects the sampling phase of each signal output from the digital phase compensating unit 230. The sampling phase detecting unit 241 outputs results of the detection as the sampling phase detection value to the variable-frequency oscillator 140 (see FIG. 1) and the digital phase compensating unit 230.

The skew detecting unit 242 detects the skew of each signal output from the digital phase compensating unit 230. Specifically, the skew detecting unit 242 detects the skews Skew_HI, Skew_HQ, Skew_VI, Skew_VQ, Skew_H, and Skew_V. The skew Skew_HI is the skew of the signal HI. The skew Skew_HQ is the skew of the signal HQ. The skew Skew_VI is the skew of the signal VI. The skew Skew_VQ is the skew of the signal VQ. The skew Skew_H is the skew of the H-axis. The skew Skew_V is the skew of the V-axis.

The skew detecting unit 242 outputs the detected skews Skew_HI, Skew_HQ, Skew_VI, Skew_VQ, Skew_H, and Skew_V as skew detection values to the skew control unit 270. The sampling phase control unit 240 outputs each sampling-phase controlled signal to the adaptive-equalization waveform distortion compensating unit 250.

The adaptive-equalization waveform distortion compensating unit 250 performs adaptive-equalization waveform distortion compensation on each signal output from the sampling phase control unit 240. Specifically, the adaptive-equalization waveform distortion compensating unit 250 compensates a high-speed varying component included in the waveform distortion component caused over the transmission line. The adaptive-equalization waveform distortion compensating unit 250 outputs to the demodulating unit 260, each signal that has undergone the waveform distortion compensation. The demodulating unit 260 demodulates each signal output from the adaptive-equalization waveform distortion compensating unit 250. The demodulating unit 260 outputs results of the demodulation of each signal to the framer IC 170 (see FIG. 1).

The skew control unit 270 determines the skew adjusting amount for each of the skew adjusting units 211 to 214, based on the skew detection values output from skew detecting unit 242. Specifically, for each of the signals HI, HQ, VI, and VQ, the skew control unit 270 determines each skew adjusting amount so that the skew is reduced. The skew control unit 270 may determine each skew adjusting amount based on the sampling phase detection value output from the sampling phase detecting unit 241 and the symbol shift amount output from the framer IC 170. The skew control unit 270 outputs the determined skew adjusting amounts to the skew adjusting units 211 to 214.

Thus, the digital coherent receiver 100 detects the skew among the signals converted to the digital signals and by the skew control unit 270, controls the skew of each signal so that the detected skew will be reduced, enabling a reduction in the skew among the signals as well as the digital demodulation at the demodulating unit 260 to be performed with accuracy, thereby improving the reception quality. For example, the digital coherent receiver 100 is capable of reducing the skew between the I and Q channels and the skew between the polarized waves.

The digital coherent receiver 100 detects the sampling phase at the digital converting unit 150 and reduces, by the digital phase compensating unit 230, the sampling phase variations of each signal based on the detected sampling phase, enabling the digital demodulation at the demodulating unit 260 to be performed with accuracy, improving the reception quality.

The digital coherent receiver 100 detects the sampling phase at the digital converting unit 150 and by the variable-frequency oscillator 140, oscillates the clock signal of the frequency corresponding to the detected sampling phase and inputs the clock signal into the digital converting unit 150, making it possible to sample each signal at an appropriate timing and perform the digital demodulation at the demodulating unit 260 with accuracy, thereby improving the reception quality.

The digital coherent receiver 100 detects, by the framer IC 170, the symbol shift among the signals based on results of the demodulation by the demodulating unit 260 and reduces the skew among the signals based on the detected symbol shift and skew, enabling the skew among the signals to be reduced even if there is the shift of one symbol or more among the signals.

The digital coherent receiver 100 detects the sampling phase of the signals downstream from the waveform distortion compensating units 221 to 224 so that phase variations can be detected that occur at the waveform distortion compensating units 221 to 224 due to variations in the frequency of the local light source 112. The digital coherent receiver 100 compensates the detected phase variations upstream from the adaptive-equalization waveform distortion compensating unit 250 so that the digital demodulation at the demodulating unit 260 can be performed with accuracy and the reception quality can be improved.

The digital coherent receiver 100 controls the sampling phase at the digital converting unit 150, based on the sampling phase of the signal detected downstream from the waveform distortion compensating units 221 to 224. Specifically, the digital coherent receiver 100 controls the frequency of the clock signal oscillated by the variable-frequency oscillator 140, making it possible to perform high-speed sampling at the digital converting unit 150 while preventing increased size of the circuit.

The adaptive-equalization waveform distortion compensating unit 250 demodulates while compensating the waveform distortion that varies at a speed higher than that of the waveform distortion compensated for at the waveform distortion compensating units 221 to 224. For example, the waveform distortion compensating units 221 to 224 compensate the waveform distortion that is of semi-fixed characteristics and changes according to temperature variations, etc., making it possible to perform the waveform distortion compensation and the demodulation with high accuracy at the adaptive-equalization waveform distortion compensating unit 250 while compensating phase variations due to the shift between the frequency of a transmitting light source and the frequency of the local light source 112 caused by temperature variations, etc., at the waveform distortion compensating units 221 to 224.

Figure 3:
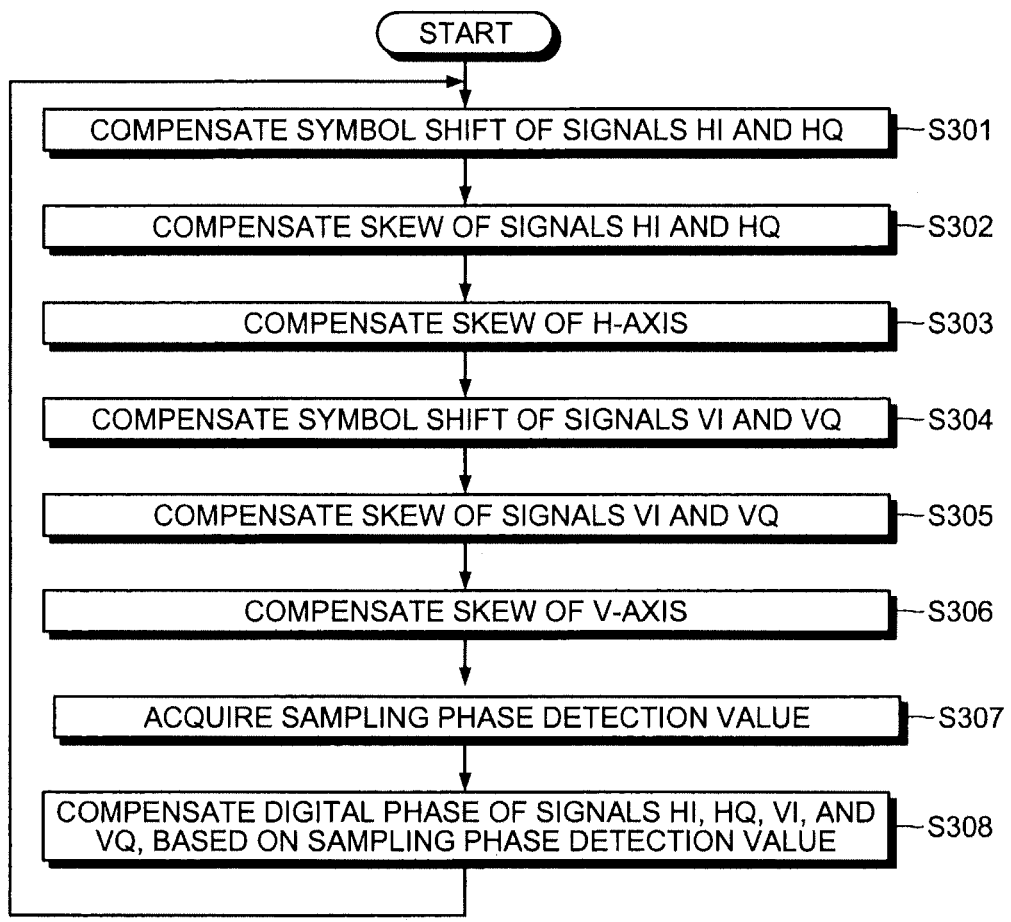
FIG. 3 is a flowchart of an operation example of the digital phase compensating unit and a skew control unit.

FIG. 3 is a flowchart of an operation example of the digital phase compensating unit and the skew control unit. The digital phase compensating unit 230 and the skew control unit 270 depicted in FIG. 2 execute, for example, the following steps. The skew control unit 270 compensates the symbol shift of the signals HI and HQ (step S301). The skew control unit 270 compensates the skew of the signals HI and HQ (step S302). The skew control unit 270 compensates the skew of the H-axis with reference to the signals HI and HQ (step S303).

The skew control unit 270 compensates the symbol shift of the signals VI and VQ (step S304). The skew control unit 270 compensates the skew of the signals VI and VQ (step S305). The skew control unit 270 compensates the skew of the V-axis with reference to the signals VI and VQ (step S306).

The digital phase compensating unit 230 acquires the sampling phase detection value from the sampling phase detecting unit 241 (step S307). The digital phase compensating unit 230 performs the digital phase compensation of the signals HI, HQ, VI, and VQ, based on the sampling phase detection value acquired at step S307 (step S308), ending a sequence of operations.

Figure 4:
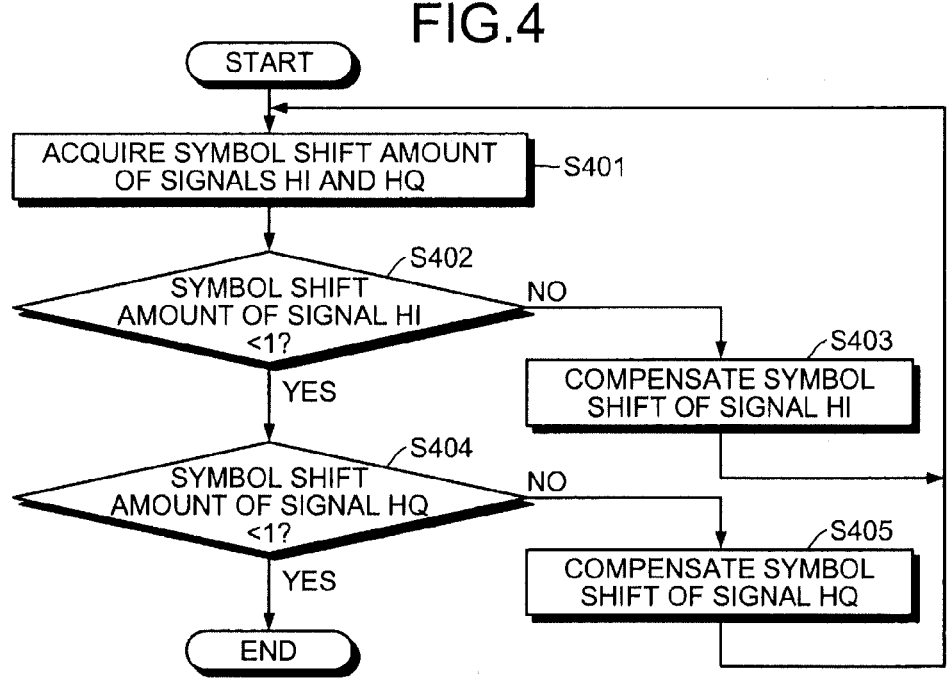
FIG. 4 is a flowchart of an example of symbol shift compensation of signals HI and HQ.

FIG. 4 is a flowchart of an example of the symbol shift compensation of the signals HI and HQ. The skew control unit 270 executes, for example, the following steps as step S301 in FIG. 3. The skew control unit 270 acquires the symbol shift amount of each of the signals HI and HQ from the framer IC 170 (step S401). The skew control unit 270 judges whether the symbol shift amount of the signal HI acquired at step S401 is less than one symbol (step S402).

If, at step S402, the symbol shift amount of the signal HI is one symbol or more (step S402: NO), the skew control unit 270 compensates the symbol shift of the signal HI, using the symbol shift amount of the signal HI (step S403). If the symbol shift amount of the signal HI is less than one symbol (step S402: YES), the skew control unit 270 judges whether the symbol shift amount of the signal HQ acquired at step S401 is less than one symbol (step S404).

If, at step S404, the symbol shift amount of the signal HQ is one symbol or more (step S404: NO), the skew control unit 270 compensates the symbol shift of the signal HQ, using the symbol shift amount of the signal HQ (step S405). If the symbol shift amount of the signal HQ is less than one symbol (step S404: YES), then the skew control unit 270 ends a sequence of operations.

Thus, when a shift of one symbol or more is caused to the signals HI and HQ, symbol shift compensation can be performed so that the shift will be less than one symbol. While the above has described the symbol shift compensation of the signals HI and HQ at step S301 of FIG. 3, the case is the same with the symbol shift compensation of the signals VI and VQ at step S304 in FIG. 3.

Figure 5:
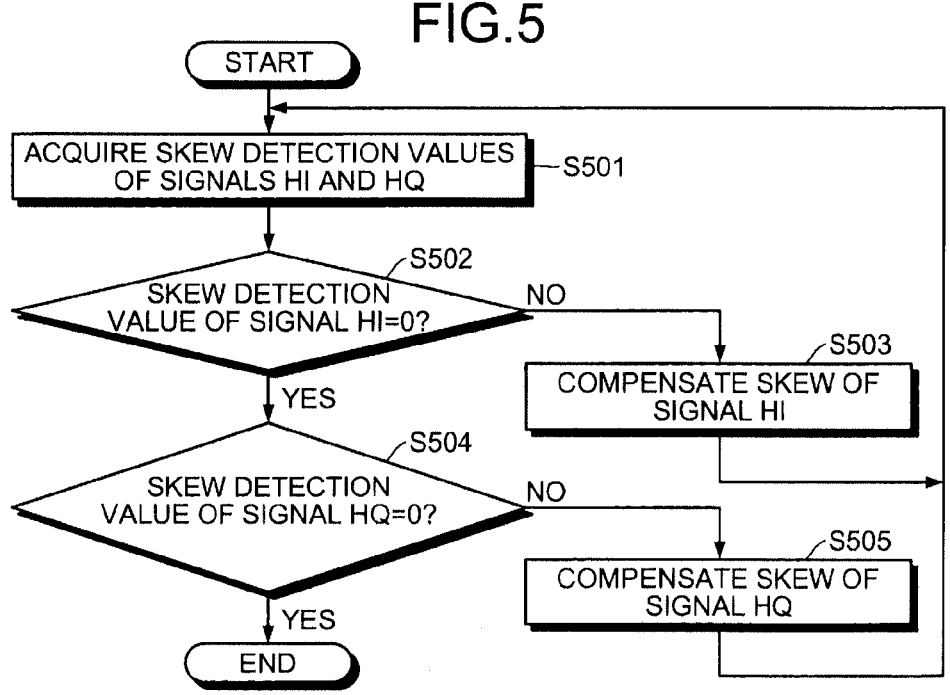
FIG. 5 is a flowchart of an example of the skew compensation of the signals HI and HQ.

FIG. 5 is a flowchart of an example of the skew compensation of the signals HI and HQ. The skew control unit 270 executes, for example, the following steps as step S302 of FIG. 3. The skew control unit 270 acquires the skew detection values (Skew_HI and Skew_HQ) of the signals HI and HQ from the skew detecting unit 242 (step S501). The skew control unit 270 judges whether the skew detection value of the signal HI acquired at step S501 is zero (including values within the error range of zero) (step S502).

If, at step S502, the skew detection value of the signal HI is not zero (step S502: NO), the skew control unit 270 performs the skew compensation of the signal HI, using the skew detection value of the signal HI (step S503). If the skew detection value of the signal HI is zero (step S502: YES), the skew control unit 270 judges whether the skew detection value of the signal HQ acquired at step S501 is zero (including values within the error range of zero) (step S504).

If, at step S504, the skew detection value of the signal HQ is not zero (step S504: NO), the skew control unit 270 performs the skew compensation of the signal HQ, using the skew detection value of the signal HQ (step S505). If the skew detection value of the signal HQ is zero (step S504: YES), the skew control unit 270 ends a sequence of operations.

Thus, it is possible to perform the skew compensation of the signals HI and HQ. While the above has described the skew compensation of the signals HI and HQ at step S302 of FIG. 3, the case is the same with the skew compensation of the signals VI and VQ at step S305 of FIG. 3.

FIG. 6 is a flowchart of an example of skew compensation of the H-axis. The skew control unit 270 executes, for example, the following steps as step S303 of FIG. 3. The skew control unit 270 acquires the skew detection value (Skew_H) of the H-axis from the skew detecting unit 242 (step S601). The skew control unit 270 judges whether the skew detection value of the H-axis acquired at step S601 is zero (including values within the error range of zero) (step S602).

If, at step S602, the skew detection value of the H-axis is not zero (step S602: NO), the skew control unit 270 performs the skew compensation of the H-axis, using the skew detection value of the H-axis (step S603). If the skew detection value of the H-axis is zero (step S602: YES), the skew control unit 270 ends a sequence of operations.

Thus, it is possible to perform the skew compensation of the H-axis. While the above has described the skew compensation of the H-axis at step S303 of FIG. 3, the case is the same with the skew compensation of the V-axis at step S306 of FIG. 3.

Figure 7B:
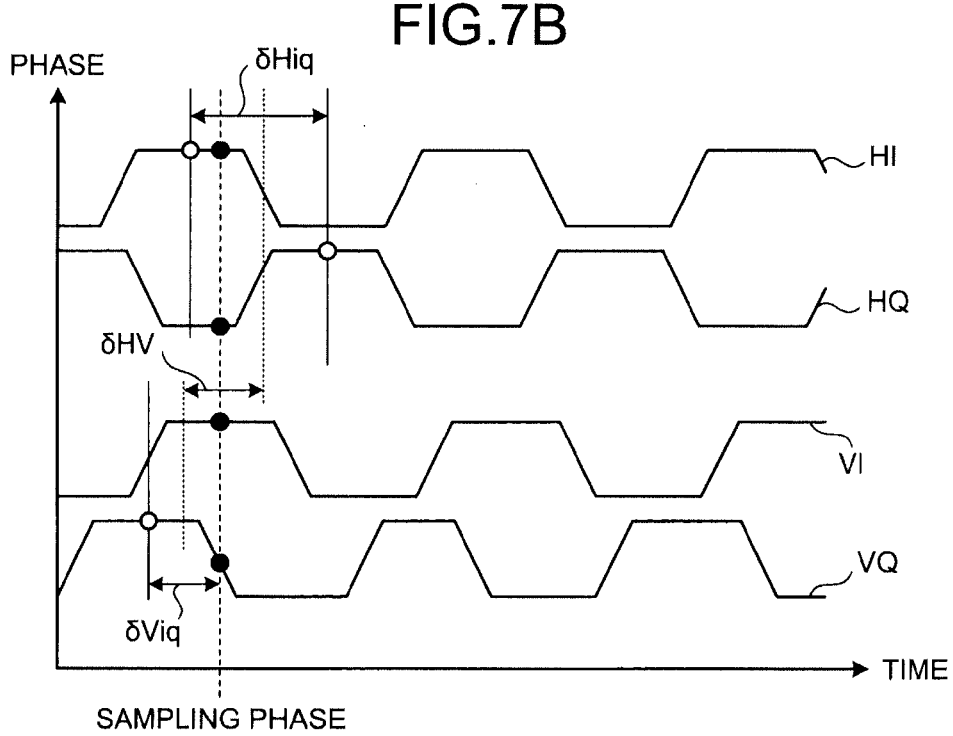
FIG. 7B depicts the signals after symbol shift compensation along the H-axis.

FIG. 7A depicts signals before compensation by the digital signal processing circuit. In FIGS. 7A to 7F, the horizontal axis represents time, the vertical axis represents phase, and "sampling phase" of the horizontal axis indicates the sampling phase in the digital converting unit 150. The signals HI, HQ, VI, and VQ depicted in FIG. 7A have a skew δHiq between the I and Q channels along the H-axis, a skew δViq between the I and Q channels along the V-axis, and a skew δHV between the H and V axes. A one-symbol shift 710 has occurred with respect to the signal HQ.

Figure 7C:
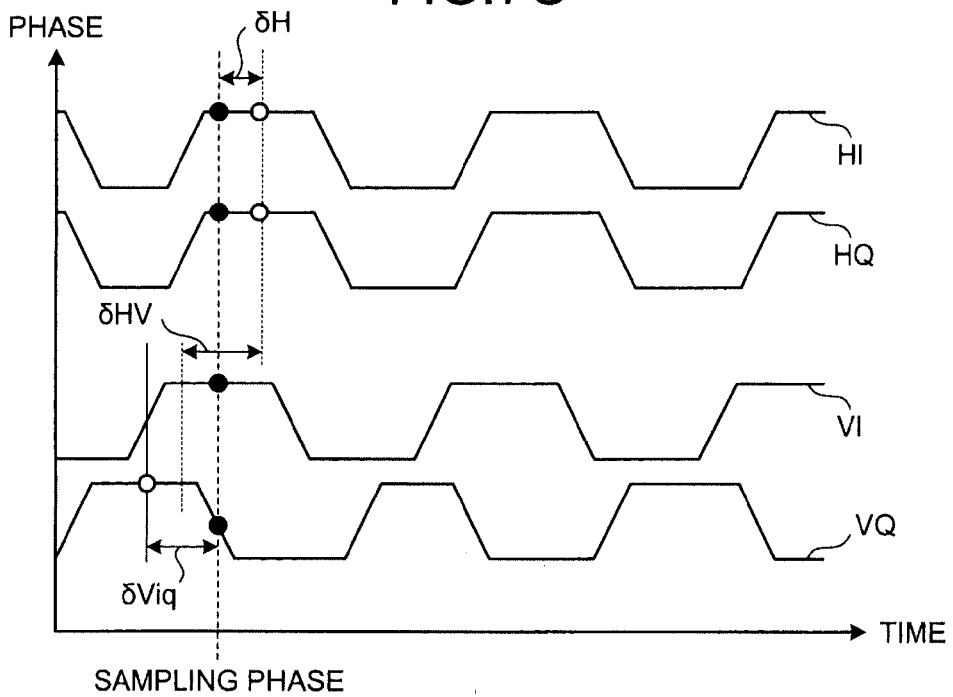
FIG. 7C depicts the signals after skew compensation between the I and Q channels along the H-axis.

FIG. 7B depicts the signals after symbol shift compensation along the H-axis. As depicted in FIG. 7B, the one-symbol shift 710 is compensated by the symbol shift compensation at step S301 depicted in FIG. 3. FIG. 7C depicts the signals after skew compensation between the I and Q channels along the H-axis. As depicted in FIG. 7C, the skew δHiq is compensated by the skew compensation between the I and Q channels at step S302 depicted in FIG. 3. In this state, the skew δH of the H-axis still remains with respect to the signals HI and HQ.

Figure 7D:
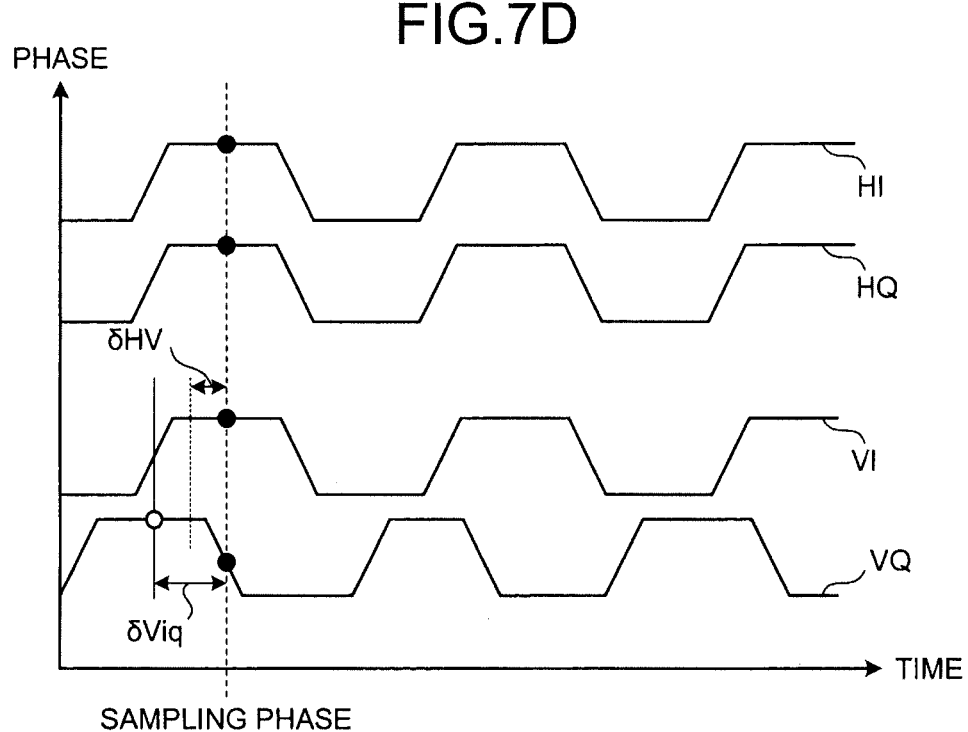
FIG. 7D depicts the signals after skew compensation of the H-axis.
Figure 7E:
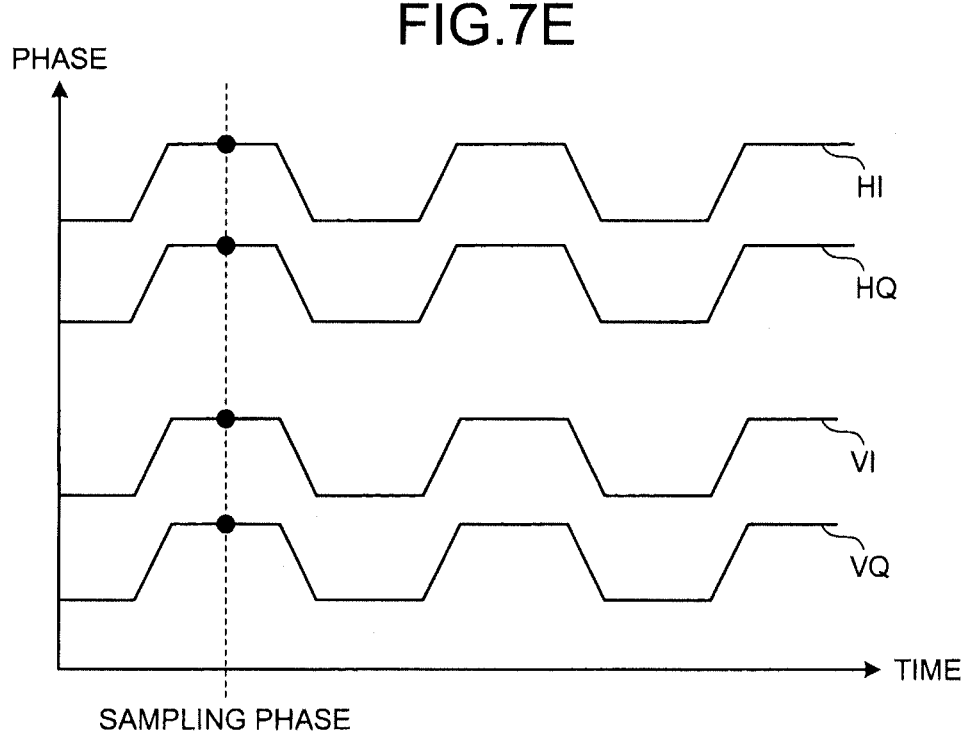
FIG. 7E depicts the signals after various compensation along the V-axis.

FIG. 7D depicts the signals after skew compensation of the H-axis. As depicted in FIG. 7D, the skew δH of the H-axis is compensated by the skew compensation of the H-axis at step S303 depicted in FIG. 3. FIG. 7E depicts the signals after various compensation along the V-axis. As depicted in FIG. 7E, the skew δHV, the skew δViq, and the skew of the V-axis are compensated by the symbol shift compensation and the skew compensation of the V polarized waves and the skew compensation of the V-axis at steps S304 to S306 depicted in FIG. 3.

FIG. 7F depicts digital phase compensation of the signals. FIG. 7F describes the signals HI, HQ, VI, and VQ in which the sampling phase is shifted from the optimal point at the digital converting unit 150, by high-speed phase variations consequent to variations in the frequency of the local light source 112. In this case as well, as depicted in FIG. 7F, the phase shift is compensated by the digital phase compensation at step S308 depicted in FIG. 3 (reference numerals 761 to 764).

Figure 8:
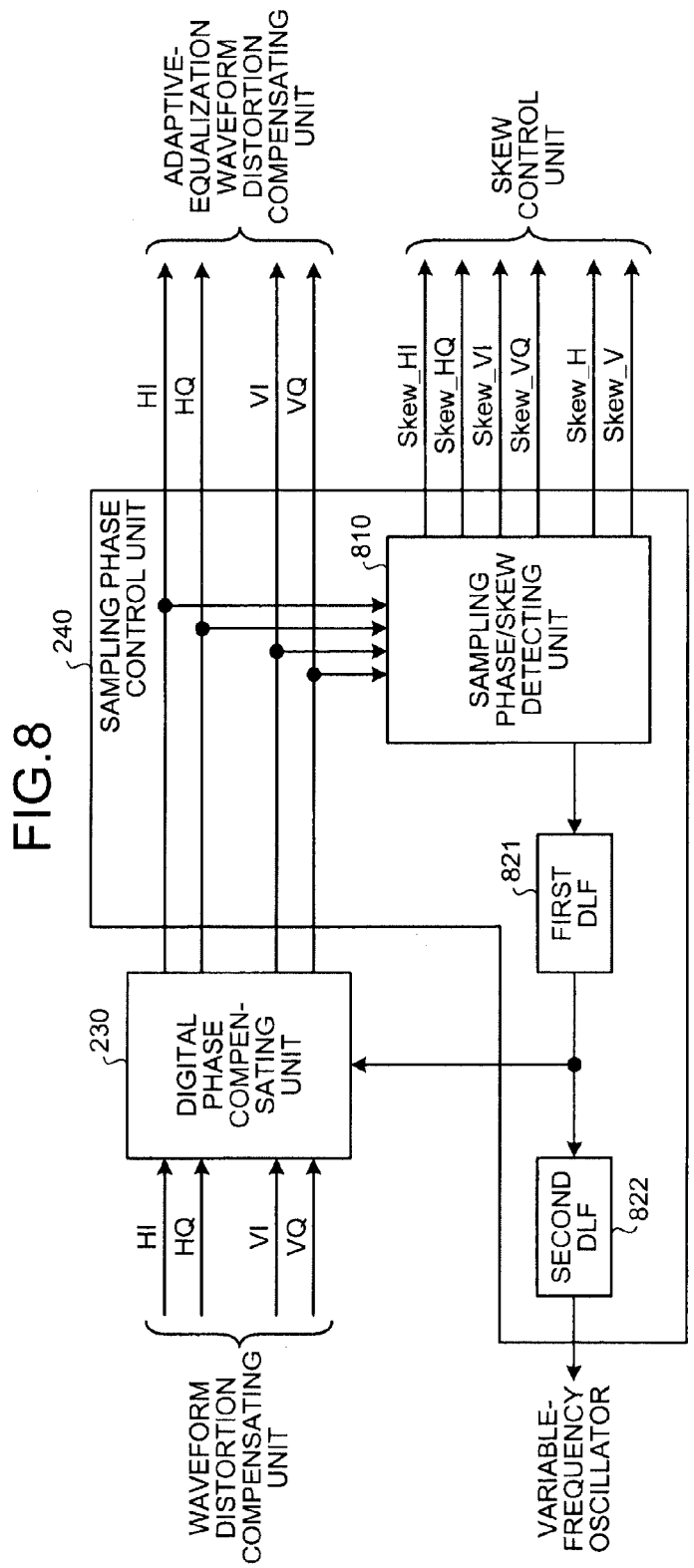
FIG. 8 depicts an example of a sampling phase control unit and the digital phase compensating unit depicted in FIG. 2.

FIG. 8 depicts an example of the sampling phase control unit and the digital phase compensating unit depicted in FIG. 2. As depicted in FIG. 8, the sampling phase control unit 240 depicted in FIG. 2 is equipped with a sampling phase/skew detecting unit 810, a first digital loop filter (DLF) 821, and a second DLF 822. The signals HI, HQ, VI, and VQ output from the digital phase compensating unit 230 are output to the adaptive-equalization waveform distortion compensating unit 250 as well as being output to the sampling phase/skew detecting unit 810.

The sampling phase/skew detecting unit 810 has the function of the sampling phase detecting unit 241 and the skew detecting unit 242 depicted in FIG. 2. Specifically, the sampling phase/skew detecting unit 810 detects the sampling phase of each input signal and outputs a signal indicative of results of the detection to the first DLF 821. The sampling phase/skew detecting unit 810 also detects the skew of each input signal. Specifically, the sampling phase/skew detecting unit 810 detects the skews Skew_HI, Skew_HQ, Skew_VI, Skew_VQ, Skew_H, and Skew_V and outputs results of the detection as the skew detection values to the skew control unit 270.

The first DLF 821 performs signal processing of the signal output from the sampling phase/skew detecting unit 810. The signal processing performed by the first DLF 821 is, for example, noise removal (low pass filter (LPF)). The first DLF 821 outputs the signal after the signal processing as the sampling phase detection value to the digital phase compensating unit 230. The first DLF 821 further outputs the signal after the signal processing to the second DLF 822.

The second DLF 822 performs the signal processing of the signal output from the first DLF 821. The signal processing performed by the second DLF 822 is, for example, conversion from a phase component to a frequency component. The second DLF 822 outputs the signal after the signal processing as the sampling phase detection value to the variable-frequency oscillator 140. The variable-frequency oscillator 140 changes the frequency of the clock to be output, based on the sampling phase detection value output from the second DLF 822, making it possible to control the sampling phase at the digital converting unit 150.

Figure 9:
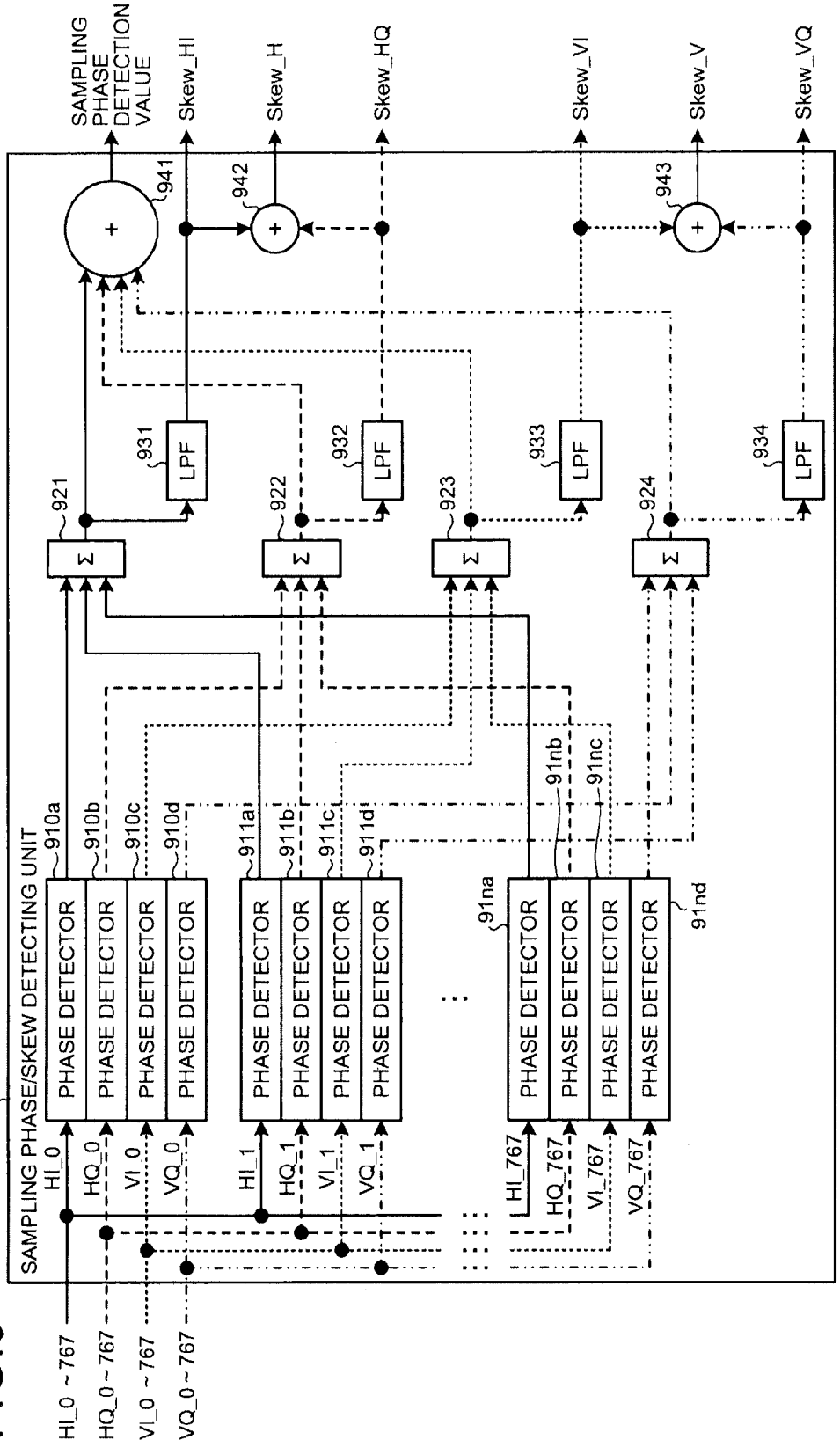
FIG. 9 depicts an example of a sampling phase/skew detecting unit depicted in FIG. 8.

FIG. 9 depicts an example of the sampling phase/skew detecting unit depicted in FIG. 8. As depicted in FIG. 9, the sampling phase/skew detecting unit 810 is equipped with phase detectors 910a to 910d, 911a to 911d, . . . , 91na to 91nd (n=767), adding units 921 to 924, LPFs 931 to 934, and adding units 941 to 943.

The signals HI, HQ, VI, and VQ to be input to the sampling phase/skew detecting unit 810, each of which is a 768-system parallel signal, include signals HI_0 to 767, HQ_0 to 767, VI_0 to 767, and VQ_0 to 767, respectively.

The phase detector 910a receives input of the signal HI_0. The phase detector 910a detects the phase of the signal HI_0. The phase detector 910a outputs results of the detection to the adding unit 921. Likewise, the phase detectors 910b to 910d receive input of the signals HQ_0, VI_0, and VQ_0, respectively. The phase detectors 910b to 910d detect the phase of the input signals HQ_0, VI_0, and VQ_0, respectively. The phase detectors 910b to 910d output the results of the detection to the adding units 922 to 924, respectively.

The phase detectors 911a to 911d are of the same configuration as that of the phase detectors 910a to 910d, respectively. It should be noted, however, that the phase detectors 911a to 911d receive input of the signals HI_1, HQ_1, VI_1, and VQ_1, respectively. The phase detectors 91na to 91nd are of the same configuration as that of the phase detectors 910a to 910d, respectively. It should be noted, however, that the phase detectors 91na to 91nd receive input of the signals HI_767, HQ_767, VI_767, and VQ_767, respectively.

The adding unit 921 adds results of the detection of the phase output from the phase detectors 910a, 911a, . . . , 91na and outputs a signal indicative of results of the addition to the LPF 931 and the adding unit 941. The adding unit 922 adds results of the detection of the phase output from the phase detectors 910b, 911b, 91nb and outputs a signal indicative of results of the addition to the LPF 932 and the adding unit 941.

The adding unit 923 adds results of the detection of the phase output from the phase detectors 910c, 911c, . . . , 91nc and outputs a signal indicative of results of the addition to the LPF 933 and the adding unit 941. The adding unit 924 adds results of the detection of the phase output from the phase detectors 910d, 911d, . . . , 91nd and outputs a signal indicative of results of the addition to the LPF 934 and the adding unit 941.

The LPF 931 removes a high-frequency component of the signal output from the adding unit 921. The LPF 931 outputs to the adding unit 942 and as the skew Skew_HI, the signal having the high-frequency component removed. The LPF 932 removes a high-frequency component of the signal output from the adding unit 922. The LPF 932 outputs to the adding unit 942 and as the skew Skew_HQ, the signal having the high-frequency component removed.

The LPF 933 removes a high-frequency component of the signal output from the adding unit 923. The LPF 933 outputs to the adding unit 943 and as the skew Skew_VI, the signal having the high-frequency component removed. The LPF 934 removes a high-frequency component of the signal output from the adding unit 924. The LPF 934 outputs to the adding unit 943 and as the skew Skew_VQ, the signal having the high-frequency component removed.

The adding unit 941 adds the signals output from the adding units 921 to 924 and outputs the added signals as the sampling phase detection value, making it possible to acquire a sampling phase value at which the signal of ½-symbol-shifted phase comes to a zero-cross point. The adding unit 942 adds the signals output from the LPFs 931 and 932 and outputs the added signals as the skew Skew_H. The adding unit 943 adds the signals output from the LPFs 933 and 934 and outputs the added signals as the skew Skew_V.

Figure 10:
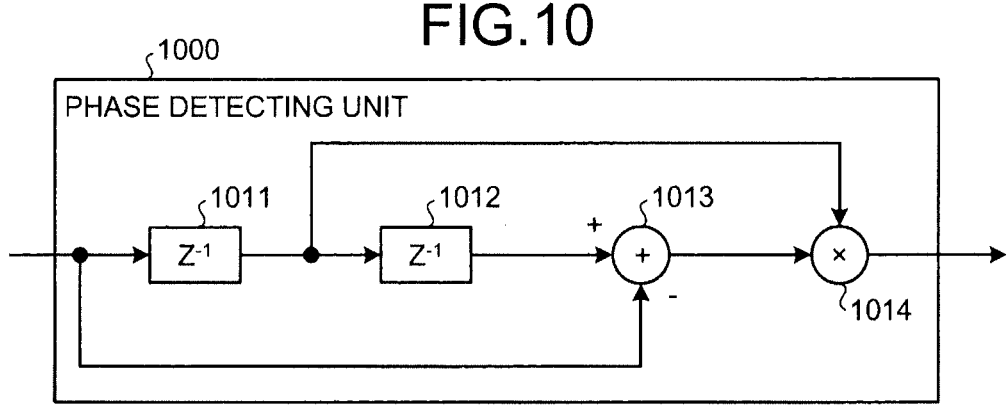
FIG. 10 depicts an example of the phase detector depicted in FIG. 9.

FIG. 10 depicts an example of the phase detector depicted in FIG. 9. A phase detector 1000 depicted in FIG. 10 is a Gardner-scheme phase detector. The phase detector 1000 is applicable to each of the phase detectors 910a to 910d, 911a to 911d, . . . , 91na to 91nd depicted in FIG. 9. As depicted in FIG. 10, the phase detector 1000 is equipped with a delay unit 1011, a delay unit 1012, a subtracting unit 1013, and a multiplying unit 1014.

The phase detector 1000 receives input of a signal that has undergone, for example, two-fold oversampling. The signal input to the phase detector 1000 is input to the delay unit 1011 and the subtracting unit 1013. The delay unit 1011 delays the signal by a 1/2 symbol and outputs the delayed signal to the delay unit 1012 and the multiplying unit 1014. The delay unit 1012 delays the signal output from the delay unit 1011 by the ½ symbol and outputs the delayed signal to the subtracting unit 1013.

The subtracting unit 1013 subtracts the signal input to the phase detector 1000 from the signal output from the delay unit 1012 and outputs results of the subtraction to the multiplying unit 1014. The signal to be output from the subtracting unit 1013 is the difference between the signals having one symbol shift. The multiplying unit 1014 multiplies the ½-symbol-shifted signal output from the delay unit 1011 by the difference between the signals having one symbol shift output from the subtracting unit 1013 and outputs results of the multiplication as results of the detection of the phase.

Figure 11:
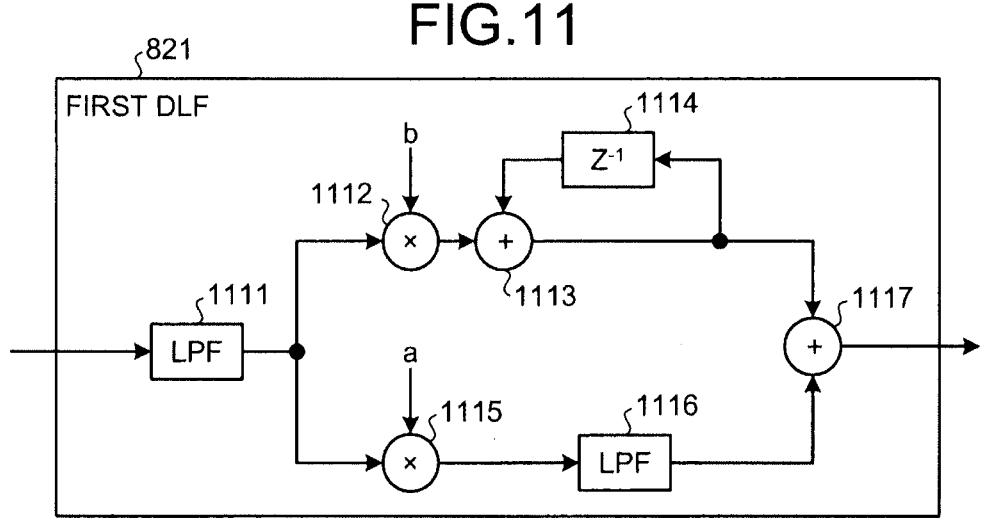
FIG. 11 depicts an example of a first digital loop filter depicted in FIG. 8.

FIG. 11 depicts an example of the first DLF depicted in FIG. 8. As depicted in FIG. 11, the first DLF 821 is equipped with an LPF 1111, a multiplying unit 1112, an adding unit 1113, a delay unit 1114, a multiplying unit 1115, an LPF 1116, and an adding unit 1117. The LPF 1111 receives input of the signal output from the sampling phase/skew detecting unit 810. The LPF 1111 extracts a low-frequency component of the input signal and outputs the extracted signal to the multiplying unit 1112 and the multiplying unit 1115.

The multiplying unit 1112 multiplies the signal output from the LPF 1111 by a coefficient b and outputs the resulting signal to the adding unit 1113. The adding unit 1113 adds the signal output from the delay unit 1114 to the signal output from the multiplying unit 1112 and outputs the added signals as an integral term to the delay unit 1114 and the adding unit 1117. The delay unit 1114 delays the signal output from the adding unit 1113 by one operating clock of the first DLF 821 and outputs the delayed signal to the adding unit 1113.

The multiplying unit 1115 multiplies the signal output from the LPF 1111 by a coefficient a and outputs the resulting signal to the LPF 1116. The LPF 1116 extracts a low-frequency component of the signal output from the multiplying unit 1115 and outputs the extracted signal as a proportional to the adding unit 1117. The adding unit 1117 adds the integral term output from the adding unit 1113 and the proportional output from the LPF 1116. The adding unit 1117 outputs the added signals.

The above configuration converts the signal input to the first DLF 821 (sampling phase detection value) to a phase control signal as a sum of the proportional and the integral term having the coefficients a and b. The coefficients a and b are determined, for example, depending on the design of the digital coherent receiver 100 and transmission conditions.

The LPF 1111 operates as a decimation filter to process each phase signal of the parallelized signals (I and Q channels and H and V axes). For example, the LPF 1111 outputs an average or a sum of the phase signals as a simple example. The LPF 1111, however, can be omitted from the configuration.

The LPF 1116 is provided to suppress a high-frequency noise component of the phase signal. The variation cycle of the frequency variations of the local light source 112 occasionally has a component of several hundred [kHz] or over. For this reason, to minimize the control loop delay, the LPF 1116 for suppressing the high-frequency noise is inserted only for the proportional. The LPF 1116, however, can be omitted from the configuration.

Figure 12:
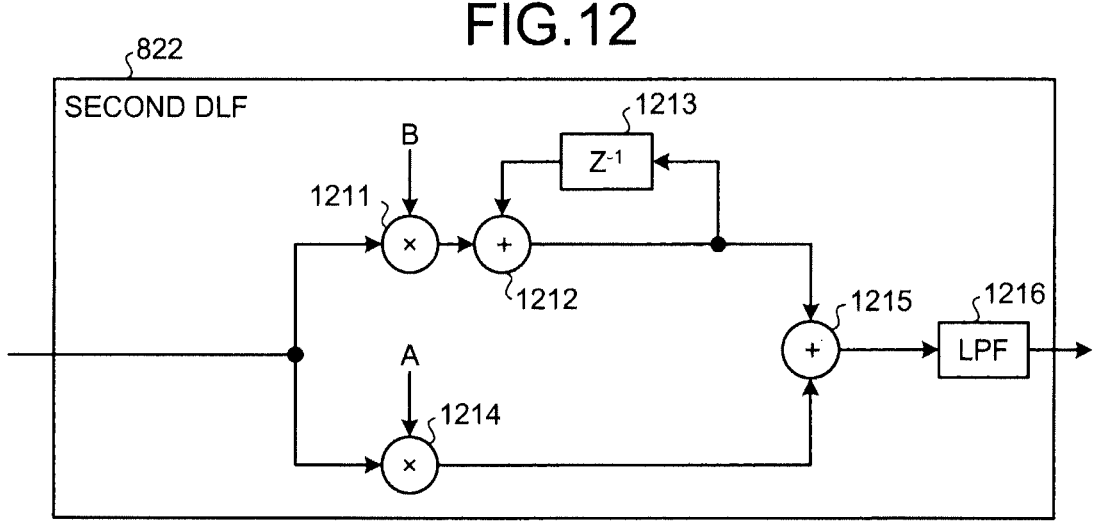
FIG. 12 depicts an example of a second digital loop filter depicted in FIG. 8.

FIG. 12 depicts an example of the second DLF depicted in FIG. 8. As depicted in FIG. 12, the second DLF 822 is equipped with a multiplying unit 1211, an adding unit 1212, a delay unit 1213, a multiplying unit 1214, an adding unit 1215, and an LPF 1216. The signal input to the second DLF 822 is input to the multiplying units 1211 and 1214.

The multiplying unit 1211 multiplies the input signal by a coefficient b and outputs the resulting signal to the adding unit 1212. The adding unit 1212 adds the signal output from the delay unit 1213 to the signal output from the multiplying unit 1211 and outputs the added signals as an integral term to the delay unit 1213 and the adding unit 1215. The delay unit 1213 delays the signal output from the adding unit 1212 by one operating clock of the second DLF 822 and outputs the delayed signal to the adding unit 1212.

The multiplying unit 1214 multiplies the input signal by a coefficient A and outputs the resulting signal as a proportional to the adding unit 1215. The adding unit 1215 adds the signal output as the integral term from the adding unit 1212 and the signal output as the proportional from the multiplying unit 1214 and outputs the added signals to the LPF 1216. The LPF 1216 extracts the low-frequency component of the signal output from the adding unit 1215 and outputs the extracted signal as a frequency control signal to the variable-frequency oscillator 140.

The above configuration converts the signal input to the second DLF 822 to a frequency control signal as a sum of the proportional and the integral term having the coefficients A and B. The coefficients A and B are determined, for example, depending on the design of the digital coherent receiver 100 and transmission conditions.

The LPF 1216 is an LPF to prevent the high-frequency noise from being placed on the clock to be output from the variable-frequency oscillator 140. The LPF 1216, however, may be omitted from the configuration.

FIG. 13 depicts an example of the digital phase compensating unit depicted in FIG. 2. The digital phase compensating unit 230 depicted in FIG. 13 represents a configuration example of an N-tap finite impulse response (FIR) filter. As depicted in FIG. 13, the digital phase compensating unit 230 is equipped with N−1 delay units 1312 to 131N, N multiplying units 1321 to 132N, and an adding unit 1330. The signal input to the digital phase compensating unit 230 is input to the delay unit 1312 and the multiplying unit 1321.

The delay unit 1312 delays the input signal and outputs the delayed signal to the multiplying unit 1322 and the delay unit 1313 downstream. Likewise, the delay units 1313 to 131N delay the signal output from the delay units at the previous stage and output the delayed signal to the multiplying units 1323 to 132N and the delay units downstream. The multiplying unit 1321 multiplies the input signal by a tap coefficient c1 and outputs the resulting signal to the adding unit 1330. Likewise, the multiplying units 1322 to 132N multiply the input signal by tap coefficients c2 to cN and output the resulting signal to the adding unit 1330.

The adding unit 1330 adds the signals output from the multiplying units 1321 to 132N and outputs results of the addition downstream, making it possible to complement the sampling data by a (N−1)-th degree function. The sampling phase control unit 240 controls the tap coefficients c1 to CN based on the sampling phase detection value output from the sampling phase detecting unit 241.

FIG. 14 depicts an example of the digital phase compensating unit depicted in FIG. 13. The digital phase compensating unit 230 depicted in FIG. 14 represents a configuration example of a 3-tap FIR filter that performs data recovery at two sampling points per symbol, using a complementary equation by a quadratic function, where N of FIG. 13 is N=3. The digital phase compensating unit 230 depicted in FIG. 14 is equipped with coefficient calculating units 1411 to 1413 in addition to the configuration depicted in FIG. 13.

The coefficient calculating units 1411 to 1413 calculate the tap coefficients c1 to c3, respectively, based on the sampling phase detection value δ to be output from the sampling phase detecting unit 241. For example, the coefficient calculating unit 1411 calculates $2\delta^2+\delta$ as the tap coefficient c1, based on the sampling phase detection value δ and outputs the result to the multiplying unit 1321. The coefficient calculating unit 1412 calculates $1-\delta^2$ as the tap coefficient c2, based on the sampling phase detection value δ and outputs the result to the multiplying unit 1322. The coefficient calculating unit 1413 calculates $2\delta^2-\delta$ as the tap coefficient c3, based on the sampling phase detection value δ and outputs the result to the multiplying unit 1323.

Figure 15:
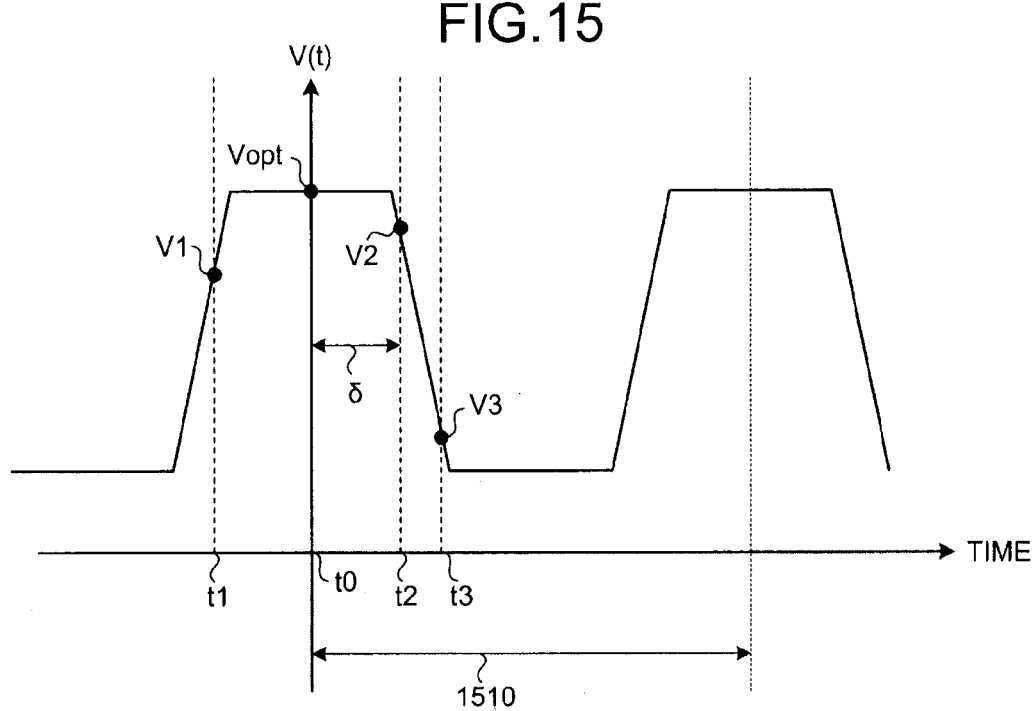
FIG. 15 depicts the sampling points of the signal.

FIG. 15 depicts the sampling points of the signal. In FIG. 15, the horizontal axis represents time. The vertical axis (V(t)) represents phase. Period 1510 represents a period of one symbol of the signal. The digital phase compensating unit 230 depicted in FIG. 14 is capable of setting the distance between the sampling points at one half of the distance of one symbol.

Consequently, a curve running through three consecutive sampling points can be approximated by a quadratic function $V=\alpha t^2+\beta t+\gamma$. Sampling points V1 to V3 indicate actual sampling points at the digital converting unit 150. A sampling point Vopt indicates the optimum sampling point at the digital converting unit 150.

t1 to t3 indicate the timing of the sampling points V1 to V3, respectively. t0 is the timing of the sampling point Vopt. t1 to t3 can be expressed as t1=δ−½, t2=δ, and t3=δ+½, respectively. The sampling phase detection value δ is the difference between optimum timing t0 and timing t2 and corresponds to the amount of the phase to be compensated for.

Vopt=V1=γ is obtained from the quadratic function $V=\alpha t^2+\beta t+\gamma$. For this reason, using the sampling points V1 to V3 and the tap coefficients C1 to C3, the sampling point Vopt is expressed as Vopt=c1×V1+c2×V2+c3×V3. Therefore, the tap coefficients c1 to C3 are obtained as c1=$2\delta^2+\delta$, c2=1−$4\delta^2$, C3=$2\delta^2-\delta$, respectively. Consequently, the digital phase compensating unit 230 is capable of performing the digital phase compensation by an appropriate phase amount.

Figure 16:
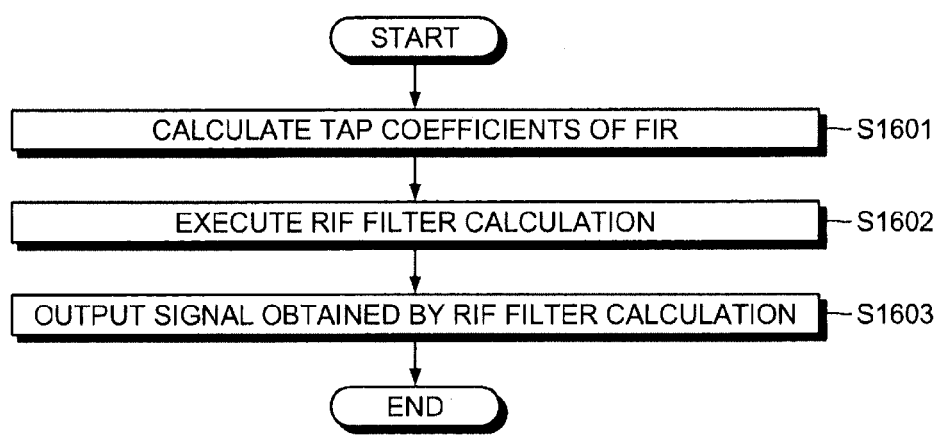
FIG. 16 is a flowchart of an operation example of the digital phase compensating unit.

FIG. 16 is a flowchart of an operation example of the digital phase compensating unit. The digital phase compensating unit 230 depicted in FIGS. 13 and 14 executes, for example, the following steps. Firstly, the coefficient calculating units 1411 to 1413 calculate the tap coefficients of the FIR based on the sampling phase detection value δ (step S1601). The multiplying units 1321 to 1323 and the adding unit 1330 execute RIF filter calculation based on the tap coefficients calculated at step S1601 (step S1602).

The digital phase compensating unit 230 outputs downstream, the signal obtained by the RIF filter calculation at step S1602 (step S1603), ending a sequence of operations. Thus, the digital phase compensating unit 230 depicted in FIGS. 13 and 14 is capable of performing the phase compensation in the time domain. A configuration will be described of the digital phase compensating unit 230 that performs the phase compensation in the frequency domain.

Figure 17:
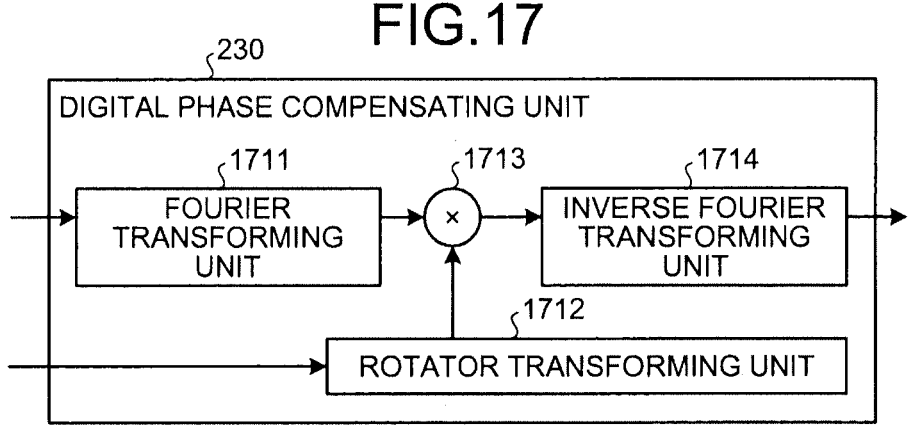
FIG. 17 depicts a configuration example of the digital phase compensating unit of a frequency-domain compensation type.

FIG. 17 depicts a configuration example of the digital phase compensating unit of a frequency-domain compensation type. The digital phase compensating unit 230 depicted in FIG. 17 represents an example of a phase compensator of the frequency-domain compensation type. As depicted in FIG. 17, the digital phase compensating unit 230 is equipped with a Fourier transforming unit 1711, a rotator transforming unit 1712, a multiplying unit 1713, and an inverse Fourier transforming unit 1714.

The Fourier transforming unit 1711 transforms, by the Fourier transform (Fast Fourier Transform (FFT)), the signal input to the digital phase compensating unit 230 into the frequency domain. The Fourier transforming unit 1711 outputs the Fourier-transformed signal to the multiplying unit 1713. The rotator transforming unit 1712 performs rotator transform processing of the sampling phase detection value δ output from the first DLF 821. The rotator transforming unit 1712 outputs to the multiplying unit 1713, a rotation coefficient Ck obtained by the rotator transform processing.

The multiplying unit 1713 multiplies the signal output from the Fourier transforming unit 1711 by the rotation coefficient Ck output from the rotator transforming unit 1712 and outputs the resulting signal to the inverse Fourier transforming unit 1714. The inverse Fourier transforming unit 1714 performs inverse Fourier transform (Inverse FFT (IFFT)) of the signal output from the multiplying unit 1713 and outputs the transformed signal. The rotation coefficient Ck can be expressed by the following equation (1), using the sampling phase detection value δ.

$$Ck=\exp(j\times 2\pi\times fk\times \delta) \qquad (1)$$

In the equation (1), fk can be expressed by the following equation (2). In the following equation (2), the sampling rate is the sampling rate at the digital converting unit 150 and the FFT window size is the FFT window size at the Fourier transforming unit 1711.

$$fk=k\times \text{sampling rate/FFT window size (k=0 to FFT window size/2 , −FFT window size/2+1 to −1)} \qquad (2)$$

Figure 18:
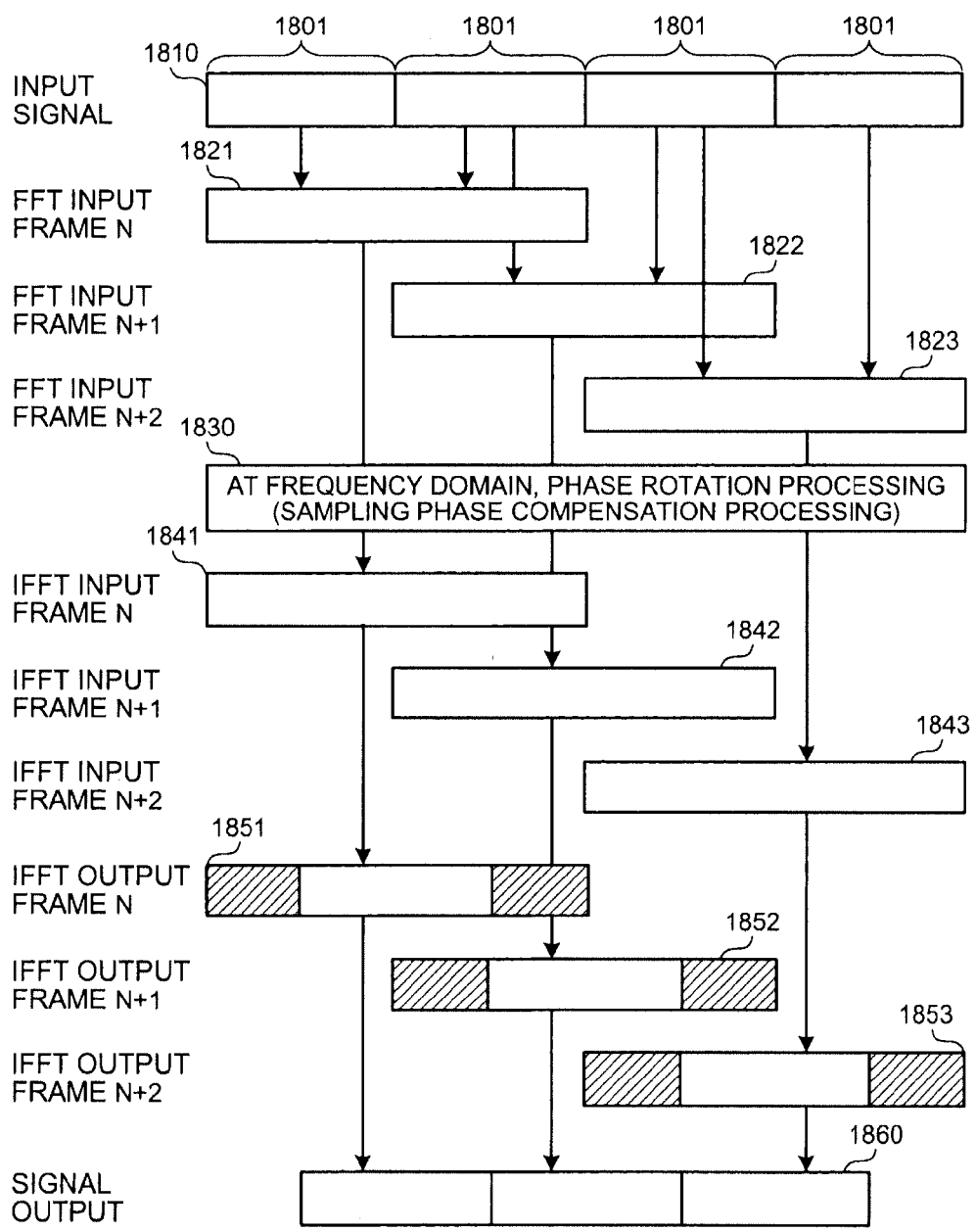
FIG. 18 depicts an example of a shift of the sampling phase.

FIG. 18 depicts an example of a shift of the sampling phase. Size 1801 is the size equal to one half of the FFT window size at the Fourier transforming unit 1711 depicted in FIG. 17. An input signal 1810 indicates the signal to be input to the digital phase compensating unit 230 depicted in FIG. 17. The Fourier transforming unit 1711 receives input of three frames 1821 to 1823 (FFT input frames N, N+1, and N+2) generated, for example, from the input signal 1810. The data length of each of the frames 1821 to 1823 corresponds to the FFT window size (twice the size 1801).

A second half of the frame 1821 and a first half of the frame 1822 overlap each other. A second half of the frame 1822 and a first half of the frame 1823 overlap each other. Each of the frames 1821 to 1823, after transform into the frequency domain by the Fourier transforming unit 1711, undergoes phase rotation processing in the frequency domain by the rotator transforming unit 1712 and the multiplying unit 1713 (reference numeral 1830). This compensates the sampling phase.

Each of the frames 1821 to 1823 that have undergone the phase rotation processing in the frequency domain is input to the inverse Fourier transforming unit 1714. Frames 1841 to 1843 (IFFT input frames N, N+1, and N+2) are frames to be input to the inverse Fourier transforming unit 1714. The inverse Fourier transforming unit 1714 transforms the frames 1841 to 1843 into time-domain signals and outputs them. Frames 1851 to 1853 (IFFT output frames N, N+1, and N+2) are frames transformed into the time-domain signals by the inverse Fourier transforming unit 1714.

The digital phase compensating unit 230 extracts a central part of each of the frames 1851 to 1853 and outputs results of the extraction downstream. Hatched portions of the frames 1851 to 1853 indicate the parts to be discarded as a result of the extraction of the central parts of the frames 1851 to 1853. The example is shown of discarding one quarter size of the FFT window size at both ends of each of the frames 1851 to 1853.

A frame 1860 (signal output) is a frame obtained by extracting and combining the central parts of the frames 1851 to 1853. The digital phase compensating unit 230 outputs the frame 1860 downstream. Thus, the digital phase compensating unit 230 depicted in FIG. 17 is capable of performing the phase compensation in the frequency domain.

Figure 19:
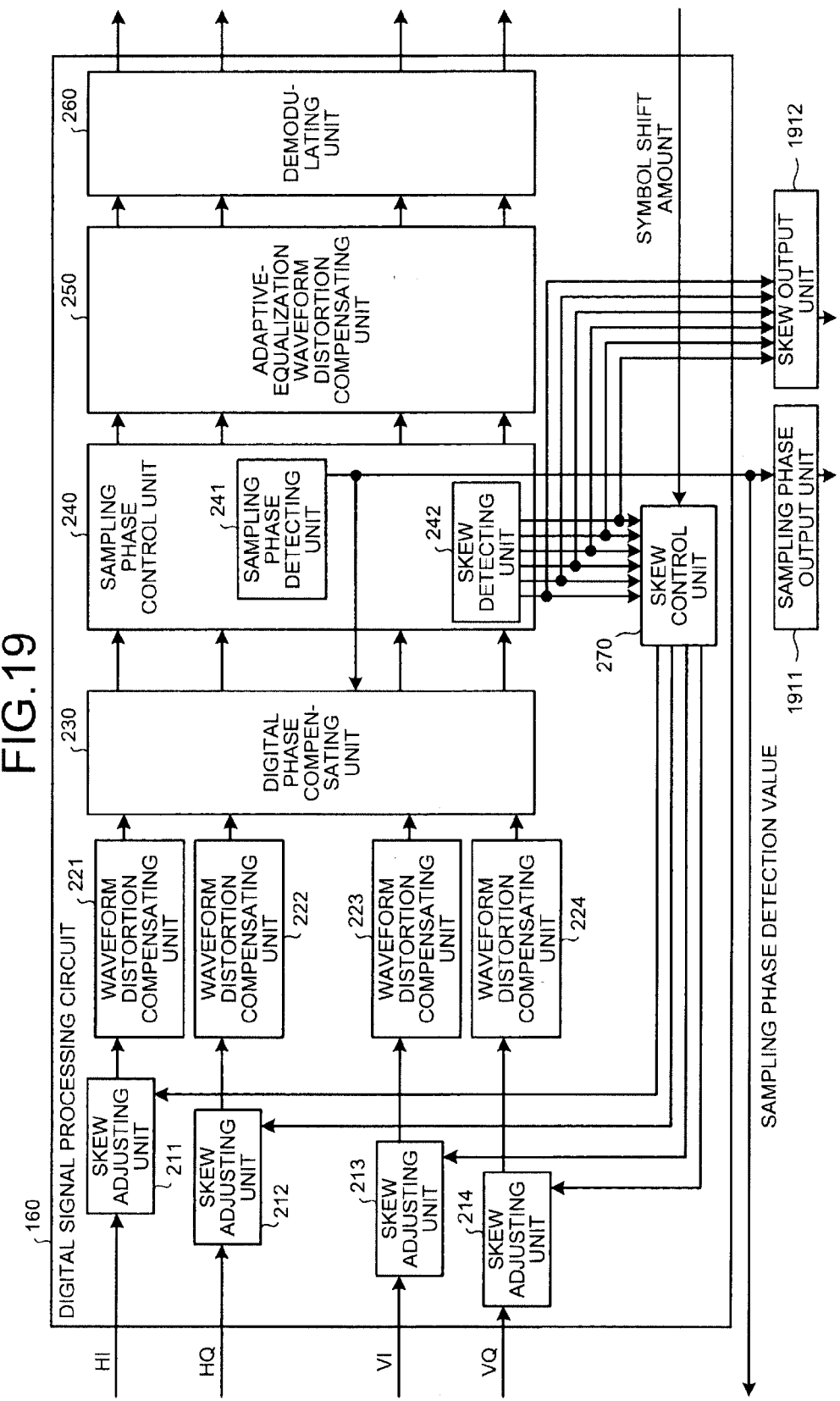
FIG. 19 depicts a first variation example of a digital coherent receiver depicted in FIGS. 1 and 2.

FIG. 19 depicts a first variation example of the digital coherent receiver depicted in FIGS. 1 and 2. In FIG. 19, components identical to those depicted in FIGS. 1 and 2 are given the same reference numerals used in FIGS. 1 and 2 and description thereof is omitted. As depicted in FIG. 19, the digital coherent receiver 100 may be equipped with a sampling phase output unit 1911 and a skew output unit 1912 in addition to the configuration depicted in FIGS. 1 and 2.

The sampling phase detecting unit 241 outputs the sampling phase detection value to the sampling phase output unit 1911. The sampling phase output unit 1911 outputs the sampling phase detection value output from the sampling phase detecting unit 241. For example, the sampling phase output unit 1911 outputs the sampling phase detection value to a user by screen display, audio output, etc.

The skew detecting unit 242 outputs the skew detection values to the skew output unit 1912. The skew output unit 1912 outputs the skew detection values output from the skew detecting unit 242. For example, the skew output unit 1912 outputs the skew detection values to the user by screen display, audio output, etc. This enables the user to monitor the sampling phase detection value and the skew detection value detected by the sampling phase control unit 240.

Figure 20:
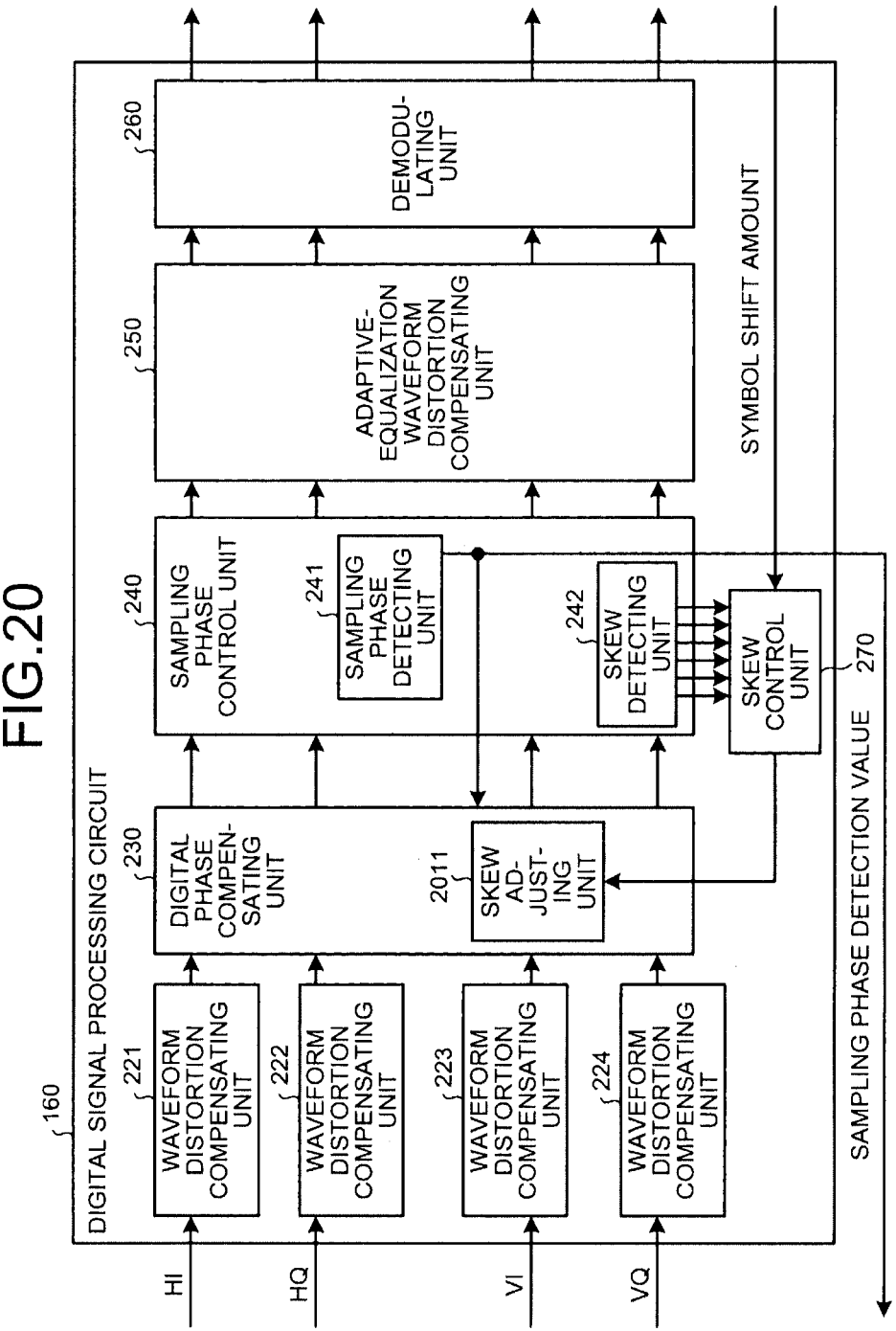
FIG. 20 depicts a second variation example of the digital coherent receiver depicted in FIGS. 1 and 2.

FIG. 20 depicts a second variation example of the digital coherent receiver depicted in FIGS. 1 and 2. In FIG. 20, components identical to those depicted in FIGS. 1 and 2 are given the same reference numerals used in FIGS. 1 and 2 and description thereof is omitted. As depicted in FIG. 20, the digital phase compensating unit 230 of the digital signal processing circuit 160 is equipped with a skew adjusting unit 2011. The skew adjusting unit 2011 has the same function as that of the skew adjusting units 211 to 214 depicted in FIG. 2.

Thus, configuration may be such that the skew adjusting units 211 to 214 and the digital phase compensating unit 230 depicted in FIG. 2 are integrated and the digital phase compensating unit 230 performs the skew adjustment. In this case, the skew adjusting units 211 to 214 depicted in FIG. 2 may be omitted from the configuration.

Figure 21:
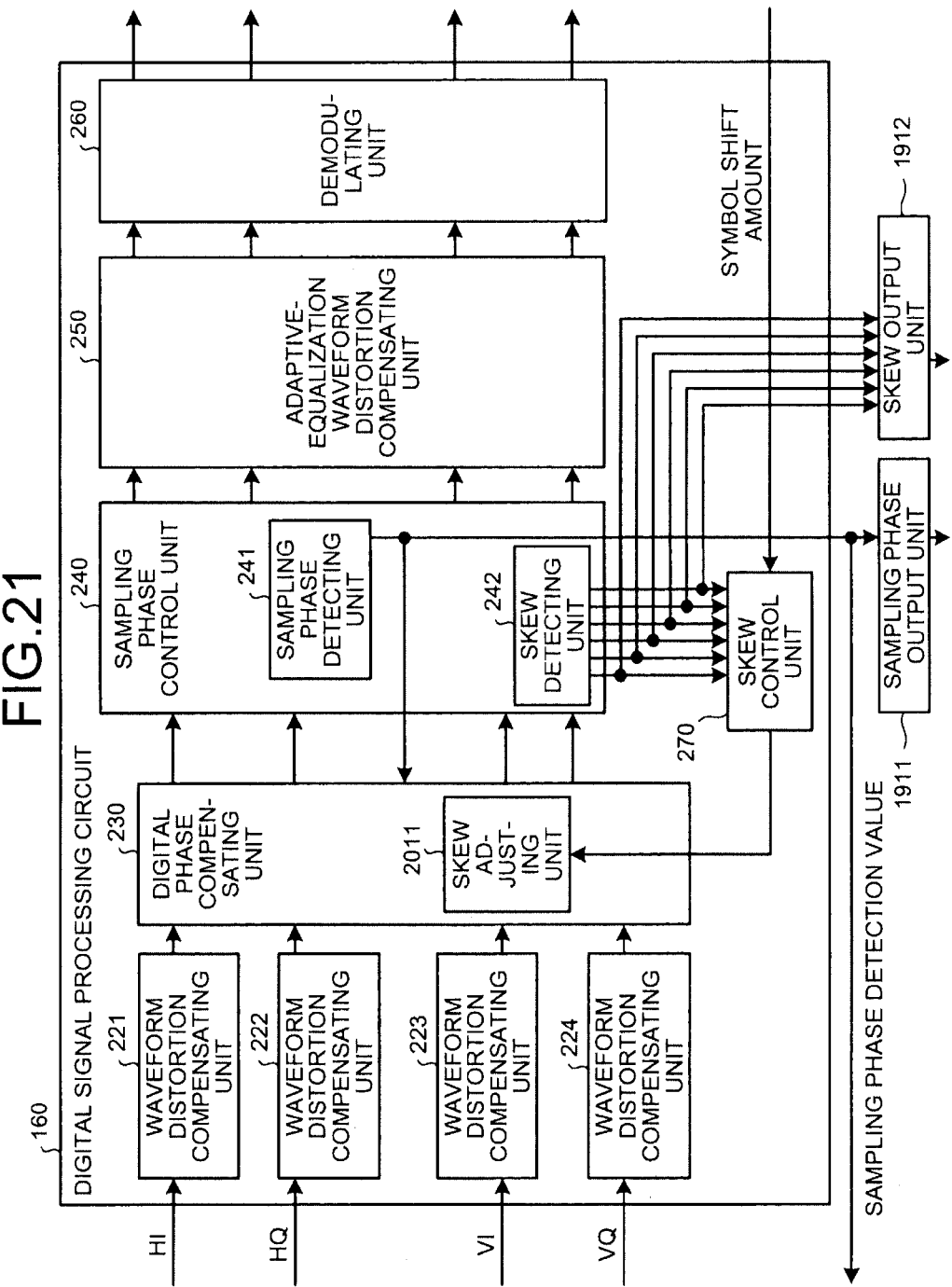
FIG. 21 depicts a third variation example of the digital coherent receiver depicted in FIGS. 1 and 2.

FIG. 21 depicts a third variation example of the digital coherent receiver depicted in FIGS. 1 and 2. In FIG. 21, components identical to those depicted in FIGS. 1 and 20 are given the same reference numerals used in FIGS. 1 and 2 and description thereof is omitted. As depicted in FIG. 21, the digital coherent receiver 100 may be equipped with the sampling phase output unit 1911 and the skew output unit 1912 (see FIG. 19) in addition to the configuration depicted in FIGS. 1 and 20. This enables the user to monitor the sampling phase detection value and the skew detection value detected by the sampling phase control unit 240.

Figure 22:
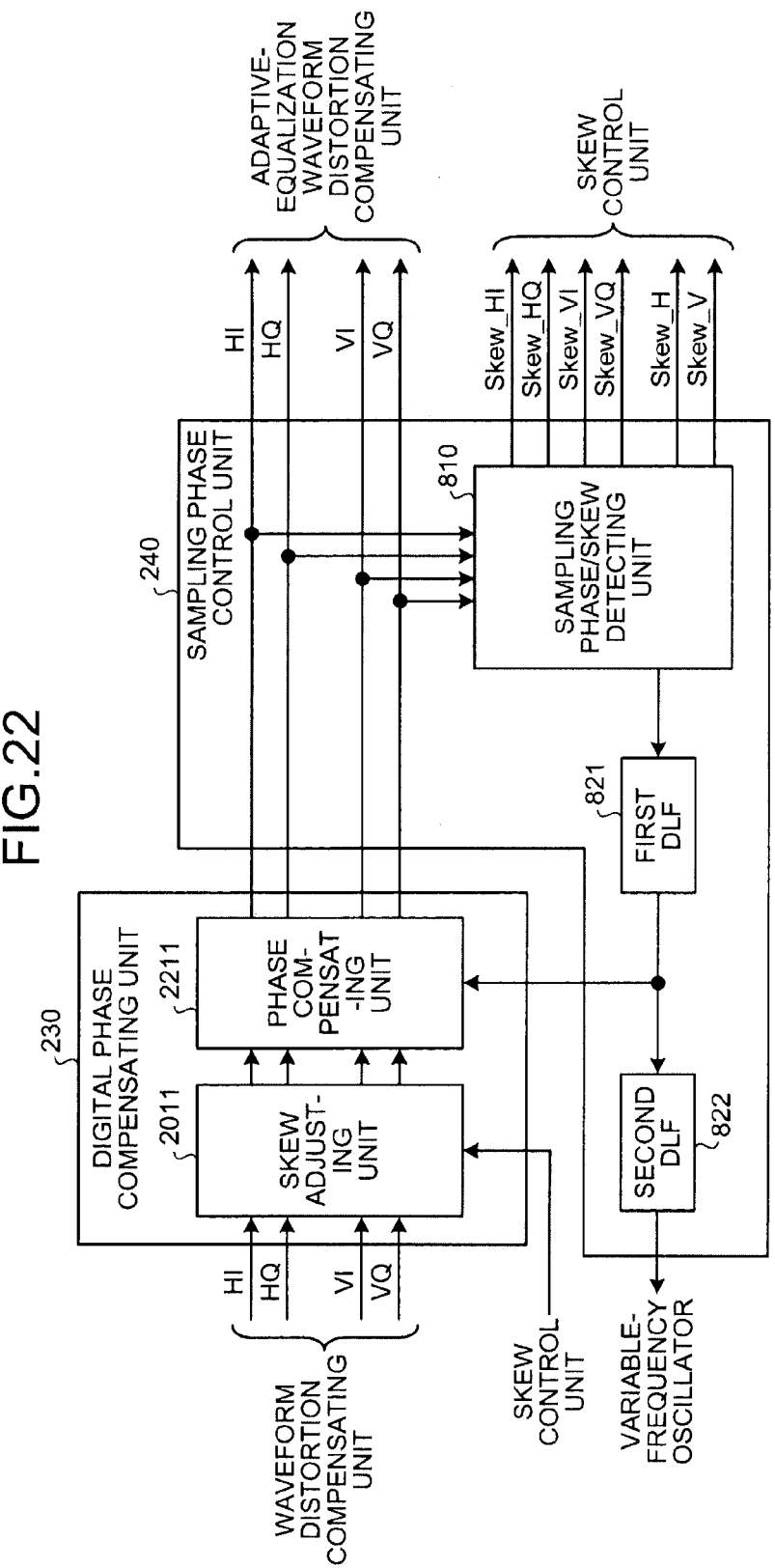
FIG. 22 depicts an example of the sampling phase control unit and the digital phase compensating unit depicted in FIGS. 20 and 21.

FIG. 22 depicts an example of the sampling phase control unit and the digital phase compensating unit depicted in FIGS. 20 and 21. In FIG. 22, components identical to those depicted in FIG. 8 are given the same reference numerals and description thereof is omitted. As depicted in FIG. 22, the digital phase compensating unit 230 depicted in FIGS. 20 and 22 is equipped with the skew adjusting unit 2011 (see FIGS. 20 and 21) and a phase compensating unit 2211.

The signals HI, HQ, VI, and VQ input to the digital phase compensating unit 230 are input to the skew adjusting unit 2011. The skew adjusting unit 2011 further receives input of the skew adjusting amounts output from the skew control unit 270. The skew adjusting unit 2011 adjusts the skew of each of the signals HI, HQ, VI, and VQ according to the corresponding skew adjusting amount. The skew adjusting unit 2011 outputs the skew-adjusted signals to the phase compensating unit 2211.

The phase compensating unit 2211 receives input of the signals HI, HQ, VI, and VQ output from the skew adjusting unit 2011 and the sampling phase detection value output from the first DLF 821. The phase compensating unit 2211 performs the phase compensation of the signals HI, HQ, VI, and VQ, based on the sampling phase detection value and outputs the signals HI, HQ, VI, and VQ that have undergone the phase compensation.

Figure 23:
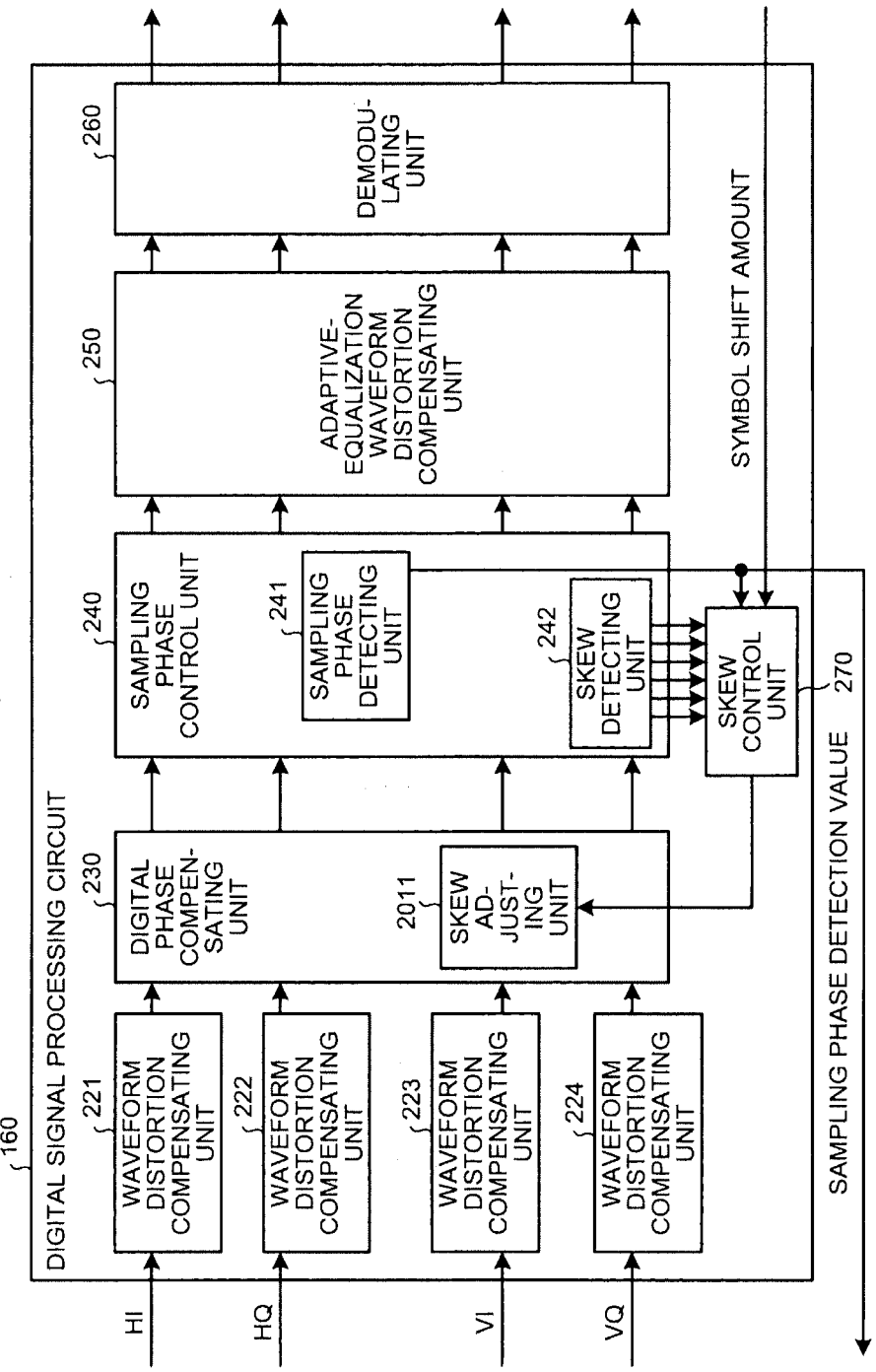
FIG. 23 depicts a fourth variation example of the digital coherent receiver depicted in FIGS. 1 and 2.

FIG. 23 depicts a fourth variation example of the digital coherent receiver depicted in FIGS. 1 and 2. In FIG. 23, components identical to those depicted in FIGS. 1 and 2 are given the same reference numerals used in FIGS. 1 and 2 and description thereof is omitted. As depicted in FIG. 23, the sampling phase detecting unit 241 of the digital signal processing circuit 160 may output the sampling phase detection value to the skew control unit 270. In this case, the sampling phase detecting unit 241 need not output the sampling phase detection value to the digital phase compensating unit 230.

The skew control unit 270 determines the skew adjusting amount at each of the skew adjusting units 211 to 214, based on the skew detection value output from the skew detecting unit 242 and the sampling phase detection value output from the sampling phase detecting unit 241. Thus, configuration may be such that the sampling phase detection value is output to the skew control unit 270 and the digital phase compensating unit 230 performs the skew amount control including the sampling phase control.

Figure 24:
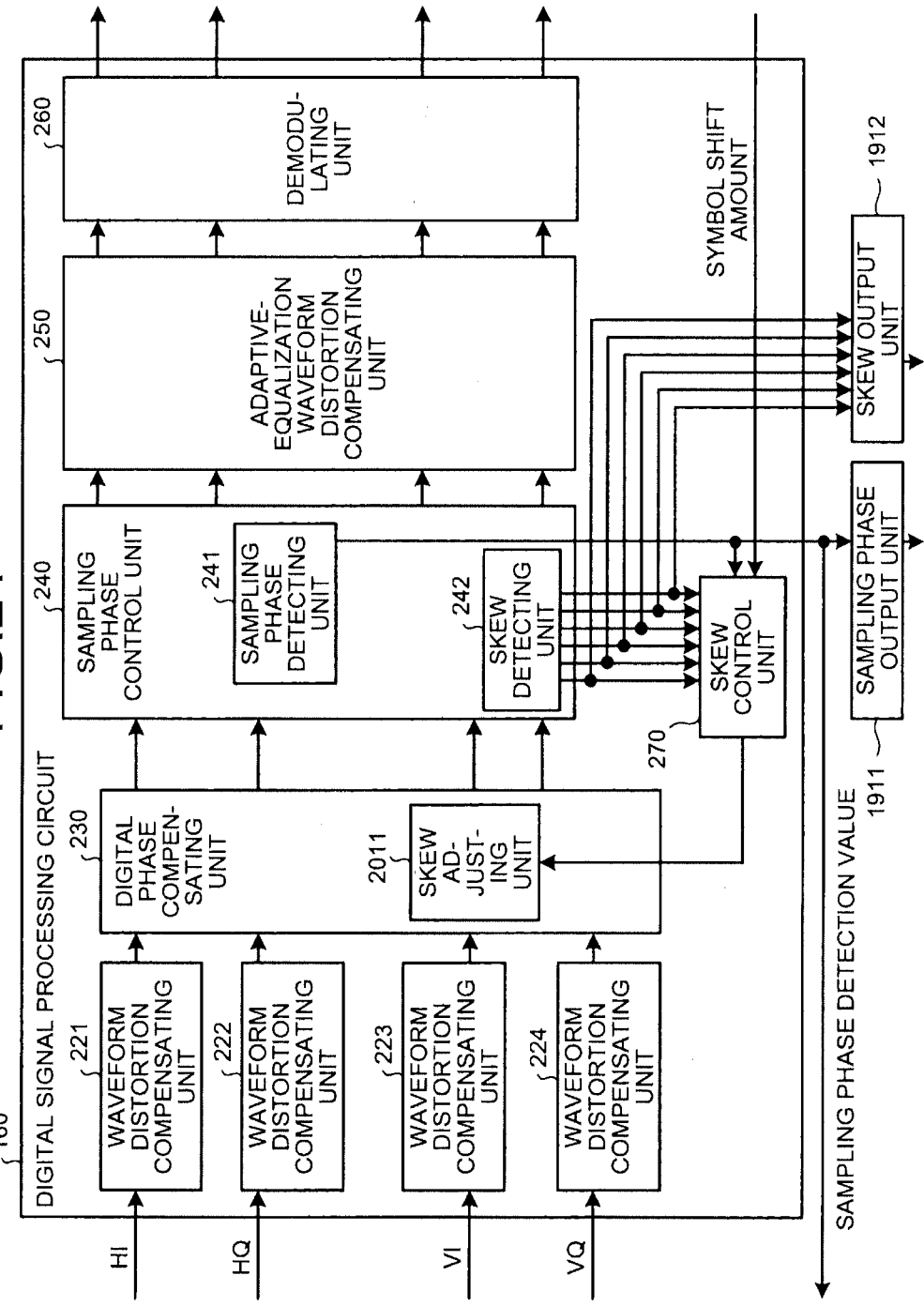
FIG. 24 depicts a fifth variation example of the digital coherent receiver depicted in FIGS. 1 and 2.

FIG. 24 depicts a fifth variation example of the digital coherent receiver depicted in FIGS. 1 and 2. In FIG. 24, components identical to those depicted in FIGS. 1 and 2 are given the same reference numerals used in FIGS. 1 and 2 and description thereof is omitted. As depicted in FIG. 24, the digital coherent receiver 100 may be equipped with the sampling phase output unit 1911 and the skew output unit 1912 (see FIG. 19) in addition to the configuration depicted in FIGS. 1 and 23. This enables the user to monitor the sampling phase detection value and the skew detection value detected by the sampling phase control unit 240.

Figure 25:
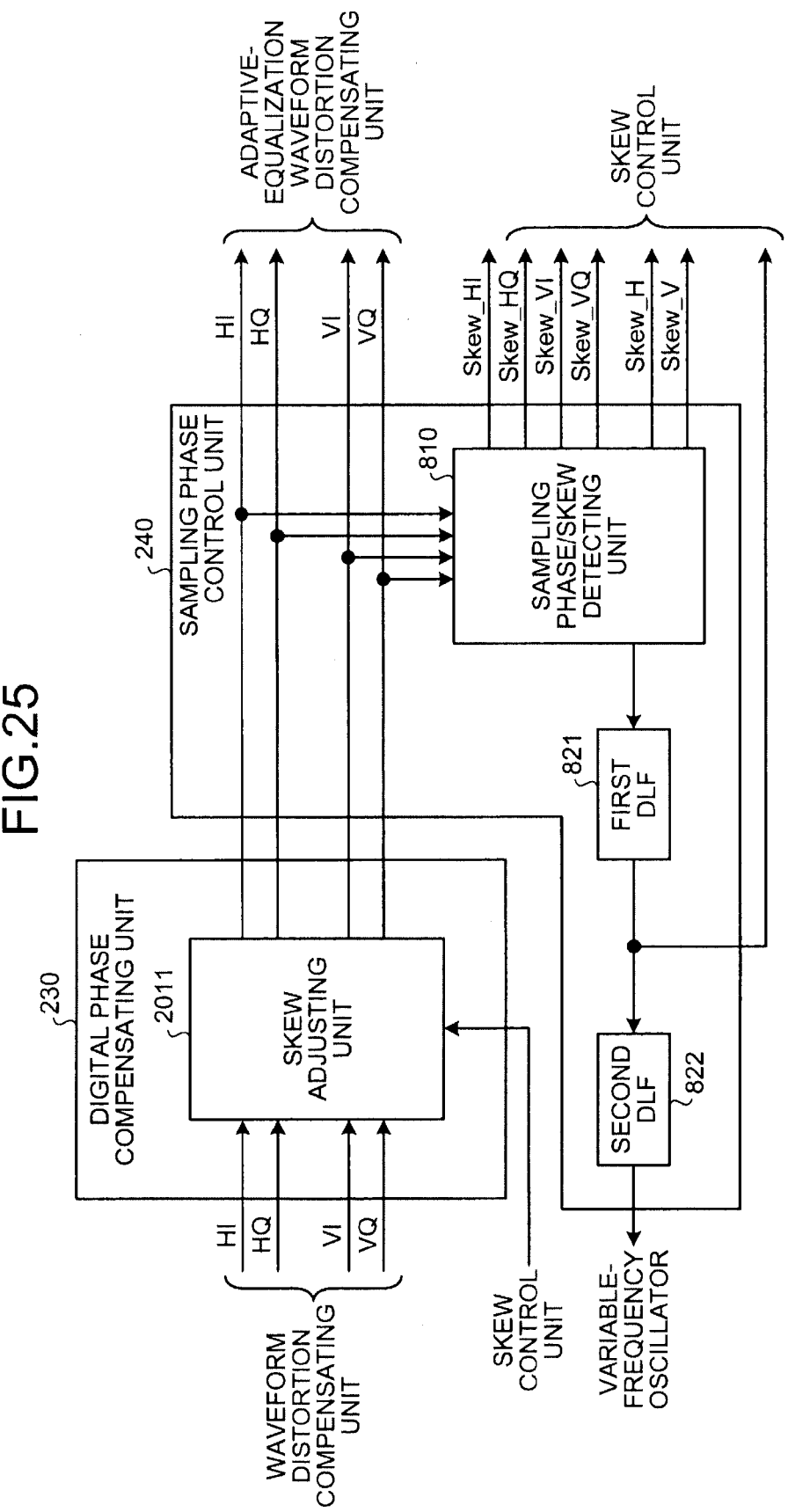
FIG. 25 depicts an example of the sampling phase control unit and the digital phase compensating unit depicted in FIGS. 23 and 24.

FIG. 25 depicts an example of the sampling phase control unit and the digital phase compensating unit depicted in FIGS. 23 and 24. In FIG. 25, components identical to those depicted in FIG. 22 are given the same reference numerals used in FIG. 22 and description thereof is omitted. As depicted in FIG. 25, the digital phase compensating unit 230 depicted in FIGS. 23 and 24 is equipped with the skew adjusting unit 2011. In this case, the phase compensating unit 2211 depicted in FIG. 22 may be omitted from the configuration. The skew adjusting unit 2011 outputs the skew-adjusted signals HI, HQ, VI, and VQ.

The first DLF 821 outputs the signal after the signal processing as the sampling phase detection value to the skew control unit 270. In this case, the first DLF 821 need not output the sampling phase detection value to the digital phase compensating unit 230.

As described above, according to the disclosed technology, the skew between the signals converted to the digital signals is detected and the skew of each signal is controlled based on the detected skew so that the skew between the signals can be reduced. Consequently, the digital demodulation can be performed with accuracy to improve the reception quality. Since the digital demodulation can be performed with accuracy even if the signals included in the signal light are sampled with same timing, an increase in circuit scale can be avoided.

The disclosed digital coherent receiver and digital coherent reception method have the effect improved reception quality.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A digital coherent receiver that converts signals and local light respectively detected, as detection results, in signal light from an optical transmission line, into digital signals and that further applies digital processing to the digital signals, the receiver comprising:
a processor; wherein the processor executes:
detecting skew between the digital signals;
controlling the skew of each of the signals so that the skew to be detected will be reduced;
demodulating each signal controlled for skew;
a digital convertor that converts the signals included in the signal light to the digital signals by sampling the detection results; wherein the processor executes:
detecting a sampling phase at the digital convertor; and
reducing phase variations of each of the signals, based on the sampling phase.

2. The digital coherent receiver according to claim 1, wherein the processor executes:
removing noise from a signal indicative of the sampling phase and outputs a phase control signal; and
reducing phase variation of each of the signals, based on the phase control signal.

3. The digital coherent receiver according to claim 1 wherein the processor executes:
outputting the sampling phase.

4. The digital coherent receiver according to claim 1, wherein:
the digital convertor samples, at identical timings, the signals included in the detection results.

5. A digital coherent receiver that converts signals and local light respectively detected, as detection results, in signal light from an optical transmission line, into digital signals and that further applies digital processing to the digital signals, the receiver comprising:
a processor; wherein the processor executes:
detecting skew between the digital signals;
controlling the skew of each of the signals so that the skew to be detected will be reduced;
demodulating each signal controlled for skew;
a digital convertor that converts the signals included in the signal light to the digital signals by sampling the detection results in synchronization with a clock signal to be input; and
a variable-frequency oscillator; wherein the processor executes:
detecting a sampling phase at the digital convertor, and
the variable-frequency oscillator oscillates the clock signal of a frequency corresponding to the sampling phase and inputs the clock signal to the digital convertor.

6. The digital coherent receiver according to claim 5, further comprising:
a digital convertor that converts the signals included in the signal light to the digital signals by the sampling detection results in synchronization with a clock signal to be input; and
a variable-frequency oscillator; wherein the processor executes:
detecting a sampling phase at the digital convertor; and
reducing phase variations of each of the signals, based on the sampling phase,
the variable-frequency oscillator oscillates the clock signal of a frequency corresponding to the sampling phase and inputs the clock signal to the digital convertor.

7. The digital coherent receiver according to claim 6, wherein the processor executes:
removing noise from a signal indicative of the sampling phase and outputs a phase control signal; and
reducing phase variation of each of the signals, based on the phase control signal.

8. The digital coherent receiver according to claim 6, wherein the processor executes:
removing noise from a signal indicative of the sampling phase and outputs a phase control signal;
converting the signal indicative of the sampling phase to a frequency control signal; and
reducing phase variation of each of the signals, based on the phase control signal, and
the variable-frequency oscillator oscillates the clock signal of the frequency corresponding to the frequency control signal.

9. The digital coherent receiver according to claim 6 wherein the processor executes:
outputting the sampling phase.

10. The digital coherent receiver according to claim 6, wherein:
the digital convertor samples, at identical timings, the signals included in the detection results.

11. The digital coherent receiver according to claim 5, wherein the processor executes:
    detecting a symbol shift between the signals, based on results of the demodulation; and
    controlling the skew between the signals, based on the symbol shift and the skew.

12. The digital coherent receiver according to claim 11, wherein the processor executes:
    reducing the symbol shift between the signals to less than one symbol based on the symbol shift and based on the skew; and
    controlling the skew between the signals for which symbol shift has been reduced to less than one symbol.

13. The digital coherent receiver according to claim 5, further comprising:
    a polarization beam splitter that separates polarization-multiplexed signals included in the signal light, wherein
    the signals separated by the polarization beam splitter are converted to the digital signals.

14. The digital coherent receiver according to claim 5, wherein the processor executes:
    extracting signals of orthogonal phases included in the signal light, and
    the extracted signals are converted to the digital signals.

15. The digital coherent receiver according to claim 5, wherein the processor executes:
    outputting the skew.

16. The digital coherent receiver according to claim 5 wherein the processor executes:
    outputting the sampling phase.

17. The digital coherent receiver according to claim 5, wherein:
    the digital convertor samples, at identical timings, the signals included in the detection results.

18. A digital coherent receiving method of converting signals and local light respectively detected, as detection results, in signal light from an optical transmission line, into digital signals and further applying digital processing to the digital signals, the method comprising:
    detecting skew between the digital signals;
    controlling the skew of each of the signals so that the skew to be detected at the detecting unit will be reduced;
    demodulating each signal controlled for skew at the controlling;
    converting the signals included in the signal light to the digital signals by sampling the detection results in synchronization with a clock signal to be input;
    detecting a sampling phase at the converting;
    oscillating the clock signal of a frequency corresponding to the sampling phase; and
    inputting the clock signal.

* * * * *